(12) United States Patent
Rottmayer et al.

(10) Patent No.: US 7,412,143 B2
(45) Date of Patent: Aug. 12, 2008

(54) HEAT ASSISTED MAGNETIC RECORDING WITH HEAT PROFILE SHAPING

(75) Inventors: Robert Earl Rottmayer, Wexford, PA (US); Julius Kurt Hohlfeld, Wexford, PA (US); William Albert Challener, Sewickley, PA (US); Chubing Peng, Pittsburgh, PA (US); Edward Charles Gage, Mars, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 649 days.

(21) Appl. No.: 10/945,077

(22) Filed: Sep. 20, 2004

(65) Prior Publication Data

US 2005/0041950 A1   Feb. 24, 2005

Related U.S. Application Data

(63) Continuation-in-part of application No. 10/391,729, filed on Mar. 19, 2003, now Pat. No. 6,795,630.

(60) Provisional application No. 60/414,968, filed on Sep. 30, 2002, provisional application No. 60/392,167, filed on Jun. 28, 2002.

(51) Int. Cl.
*G02B 6/10* (2006.01)

(52) U.S. Cl. .................. 385/129; 385/39; 369/13.32

(58) Field of Classification Search ................ None
See application file for complete search history.

(56) References Cited

U.S. PATENT DOCUMENTS

| | | | |
|---|---|---|---|
| 4,947,034 A | 8/1990 | Wickramasinghe et al. | |
| 4,994,818 A | 2/1991 | Keilmann | |
| 5,004,307 A | 4/1991 | Kino et al. | |
| 5,121,256 A | 6/1992 | Corle et al. | |
| 5,125,750 A | 6/1992 | Corle et al. | |
| 5,286,971 A | 2/1994 | Betzig et al. | |
| 5,559,330 A | 9/1996 | Murashita | |

(Continued)

FOREIGN PATENT DOCUMENTS

EP   1128372 A2   8/2001

(Continued)

OTHER PUBLICATIONS

S. M. Mansfield et al., "Solid Immersion Microscope," *Appl. Phys. Lett*, vol. 57, No. 24, Dec. 10, 1990, pp. 2615-2616.

(Continued)

*Primary Examiner*—Sung Pak
*Assistant Examiner*—Mike Stahl
(74) *Attorney, Agent, or Firm*—Robert P. Lenart, Esq.; Pietragallo Gordon Alfano Bosick & Raspanti, LLP

(57) ABSTRACT

A transducer comprises a conductive pin and a waveguide for directing electromagnetic radiation onto the pin, wherein the pin is configured to create a rectangular flat top field distribution at a surface of a storage medium positioned adjacent to an end of the pin, leading to a flat top thermal profile within the storage medium. A second pin can be included in the transducer. Recording heads that include the transducer, disc drives that include the recording head, and a method of heating a portion of a storage medium that is performed by the recording head, are also included.

23 Claims, 21 Drawing Sheets

U.S. PATENT DOCUMENTS

| | | | |
|---|---|---|---|
| 5,602,820 | A | 2/1997 | Wickramasinghe et al. |
| 5,664,036 | A | 9/1997 | Islam |
| 5,883,872 | A | 3/1999 | Kino |
| 5,930,434 | A | 7/1999 | Mowry et al. |
| 5,982,716 | A | 11/1999 | Kino et al. |
| 6,043,940 | A | 3/2000 | Kamiyama et al. |
| 6,055,220 | A | 4/2000 | Mamin et al. |
| 6,091,694 | A | 7/2000 | Späth |
| 6,275,453 | B1 | 8/2001 | Ueyanagi et al. |
| 6,298,026 | B1 | 10/2001 | Suzuki et al. |
| 6,320,708 | B1 | 11/2001 | Ueyanagi et al. |
| 6,396,776 | B1 | 5/2002 | Ueyanagi |
| 6,408,123 | B1 | 6/2002 | Kuroda et al. |
| 6,473,385 | B1 | 10/2002 | Saito |
| 6,532,125 | B1* | 3/2003 | Hamann et al. ............... 360/59 |
| 2001/0004348 | A1 | 6/2001 | Ueyanagi |
| 2001/0009541 | A1 | 7/2001 | Ueyanagi |
| 2002/0056816 | A1 | 5/2002 | Stark |
| 2002/0080709 | A1 | 6/2002 | Park et al. |
| 2002/0114567 | A1 | 8/2002 | Novotny et al. |
| 2003/0128633 | A1 | 7/2003 | Batra et al. |
| 2003/0128634 | A1 | 7/2003 | Challener |
| 2003/0137772 | A1 | 7/2003 | Challener |
| 2003/0184903 | A1 | 10/2003 | Challener |
| 2004/0001420 | A1 | 1/2004 | Challener |
| 2004/0008591 | A1 | 1/2004 | Johns et al. |
| 2005/0078565 | A1* | 4/2005 | Peng et al. ............... 369/13.32 |

FOREIGN PATENT DOCUMENTS

| | | |
|---|---|---|
| JP | 2001-256664 | 9/2001 |

OTHER PUBLICATIONS

B. D. Terris et al., "Near-Field Optical Data Storage Using A Solid Immersion Lens," *Appl. Phys. Lett*, vol. 65, No. 4, Jul. 25, 1994, pp. 388-390.

Y. Martin et al., "Optical Data Storage Read Out at 256 Gbits/in$^2$," *Appl. Phys. Lett.*, vol. 71, No. 1, Jul. 7, 1997, pp. 1-3.

H. F. Ghaemi et al., "Surface Plasmons Enhance Optical Transmission Through Subwavelength Holes", *Physical Review B*, vol. 58, No. 11, Sep. 15, 1998, pp. 6779-6782.

K. Ueyanagi et al., "Proposal of a Near-Field Optical Head Using a New Solid Immersion Mirror," *Jpn. J. Appl. Phys.*, vol. 39, Part 1, No. 2B, Feb. 2000, pp. 888-891.

Y.-J. Kim et al., "Fabrication of Micro-Pyramidal Probe Array with Aperture for Near-Field Optical Memory Applications," *Jpn. J. Appl. Phys.*, vol. 39, Part 1, No. 3B, Mar. 2000, pp. 1538-1541.

S. Quabis et al., "Focusing Light to a Tighter Spot," *Optics Communications*, vol. 179, May 25, 2000, pp. 1-7.

R. Coehoorn et al., "Hybrid Recording," *Magnetic Storage Systems Beyond 2000*, Proceedings of the NATO-ASI on Rhodes (Greece), Jun. 2000, pp. 1-17.

T. D. Milster et al., "Super-Resolution by Combination of a Solid Immersion Lens and an Aperture," *Jpn. J. Appl. Phys.*, vol. 40, Part 1, No. 3B, Mar. 2001, pp. 1778-1782.

Y.-J. Kim et al., "Parallel Recording Array Head of Nano-Aperture Flat-Tip Probes for High-Density Near-Field Optical Data Storage," *Jpn. J. Appl. Phys.*, vol. 40, Part 1, No. 3B, Mar. 2001, pp. 1783-1789.

H. Hatano et al., "Plano-Convex Solid Immersion Mirror with a Small Aperture for Near-Field Optical Data Storage," *Optical Review*, vol. 9, No. 2, Feb. 4, 2002, pp. 66-69.

T. E. Schlesinger et al., "An Integrated Read/Write Head for Hybrid Recording," *Jpn. J. Appl. Phys.*, vol. 41, Part 1, No. 3B, Mar. 2002, pp. 1821-1824.

K. Goto et al., "Microoptical Two-Dimensional Devices for the Optical Memory Head of an Ultrahigh Data Transfer Rate and Density System Using a Vertical Cavity Surface Emitting Laser (VCSEL) Array," *Jpn. J. Appl. Phys.*, vol. 41, Part 1, No. 7B, Jul. 2002, pp. 4835-4840.

B. B. Goldberg et al., "Immersion Lens Microscopy of Photonic Nanostructures and Quantum Dots," *IEEE Journal of Selected Topics in Quantum Electronics*, vol. 8, No. 5, Sep./Oct. 2002, pp. 1051-1059.

C. W. Lee et al., "Feasibility Study On Near Field Optical Memory Using A Catadioptric Optical System," Samsung Electronics Co., Ltd., Korea, pp. WA4-1/137-WA4-3/139, date unknown.

* cited by examiner

HEAT ASSISTED MAGNETIC RECORDING WITH HEAT PROFILE SHAPING

CROSS REFERENCE TO RELATED APPLICATIONS

This application is a continuation in part application of U.S. patent application Ser. No. 10/391,729, filed Mar. 19, 2003, which claims the benefit of United States Provisional Patent Application Ser. No. 60/414,968, filed Sep. 30, 2002 and United States Provisional Patent Application Ser. No. 60/392,167, filed Jun. 28, 2002. The disclosures of these applications are hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical transducers, and more particularly to optical transducers that can be used to produce a small spot of electromagnetic radiation.

BACKGROUND OF THE INVENTION

Magnetic recording heads have utility in magnetic disc drive storage systems. Magnetic recording in its conventional form has been projected to suffer from superparamagnetic instabilities at high bit densities.

Superparamagnetic instabilities become an issue as the grain volume is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with the available materials conventional "longitudinal" recording heads are not able to provide a sufficient or high enough magnetic writing field to write on such a medium. An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between the pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

Another development that is expected to overcome most of the problems associated with the superparamagnetic effect is "heat assisted magnetic recording", sometimes referred to as optical or thermal assisted recording. Heat assisted magnetic recording generally refers to the concept of locally heating a recording medium to reduce the coercivity of the recording medium so that the applied magnetic writing field can more easily direct the magnetization of the recording medium during the temporary magnetic softening of the recording medium caused by the heat source. Once the medium cools to ambient temperature, the medium has a sufficiently high value of coercivity to assure thermal stability of the recorded information. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

When applying a heat or light source to the medium, it is desirable to confine the heat or light to the track where writing is taking place and to generate the write field in close proximity to where the medium is heated to accomplish high areal density recording. In addition, for heat assisted magnetic recording (HAMR) one of the technological hurdles to overcome is to provide an efficient technique for delivering large amounts of light power to the recording medium confined to spots of, for example, 50 nm or less. A variety of transducer designs have been proposed and some have been experimentally tested. Among these are metal coated glass fibers and hollow pyramidal structures with metal walls. For all these approaches, confinement of the light depends on an aperture which is to be fabricated into the end of the structure and gives this kind of transducer the name "aperture probes." Generally these devices suffer from very low light transmission rendering the devices useless for HAMR recording. For example, tapered and metallized optical fibers have demonstrated light confinement down to approximately 50 nm with a throughput efficiency of $10^{-6}$. Pyramidal probes made from anisotropic etching of Si wafers have been designed with throughput efficiencies of $10^{-4}$ for similar spot sizes. Although this is the state of the art, it is still about two orders of magnitude too small for HAMR.

Solid immersion lenses (SILs) and solid immersion mirrors (SIMs) have also been proposed for concentrating far field optical energy into small spots. The optical intensity is very high at the focus but the spot size is still determined by the diffraction limit which in turn depends on the refractive index of the material from which the SIL or SIM is made. The smallest spot size which can be achieved with all currently known transparent materials is ~60 nm, which is too large for HAMR.

A metal pin can be used as a transducer to concentrate optical energy into arbitrarily small areal dimensions. The metal pin supports a surface plasmon mode which propagates along the pin, and the width of the external electric field generated by the surface plasmon mode is proportional to the diameter of the pin.

There is a need for transducers that can provide an electromagnetic field distribution that is suitable for heat assisted magnetic recording.

SUMMARY OF THE INVENTION

The invention provides a transducer comprising a conductive pin and a waveguide for directing electromagnetic radiation onto the pin, wherein the pin is configured to enhance the amplitude of the electromagnetic radiation and to create a rectangular flat top field distribution at a surface of a storage medium positioned adjacent to an end of the pin, leading to a flat top thermal profile within the storage medium. A second pin can be included in the transducer.

In another aspect, the invention provides a recording head comprising a magnetic write pole, and a waveguide positioned adjacent to the magnetic write pole for directing electromagnetic radiation onto a conductive pin, wherein the pin is configured to create a rectangular flat top field distribution at a surface of a storage medium positioned adjacent to an end of the pin, leading to a flat top thermal profile within the storage medium.

Disc drives that include the recording head and a method of heating a portion of a storage medium that is performed by the recording head, are also included.

BRIEF DESCRIPTION OF THE DRAWINGS

FIG. 23b is a curve representing the lateral circular symmetry of the profile shown in FIG. 23a.

FIG. 24b is a curve representing the lateral rectangular shape of the profile shown in FIG. 24a.

DETAILED DESCRIPTION OF THE INVENTION

Figure 1:
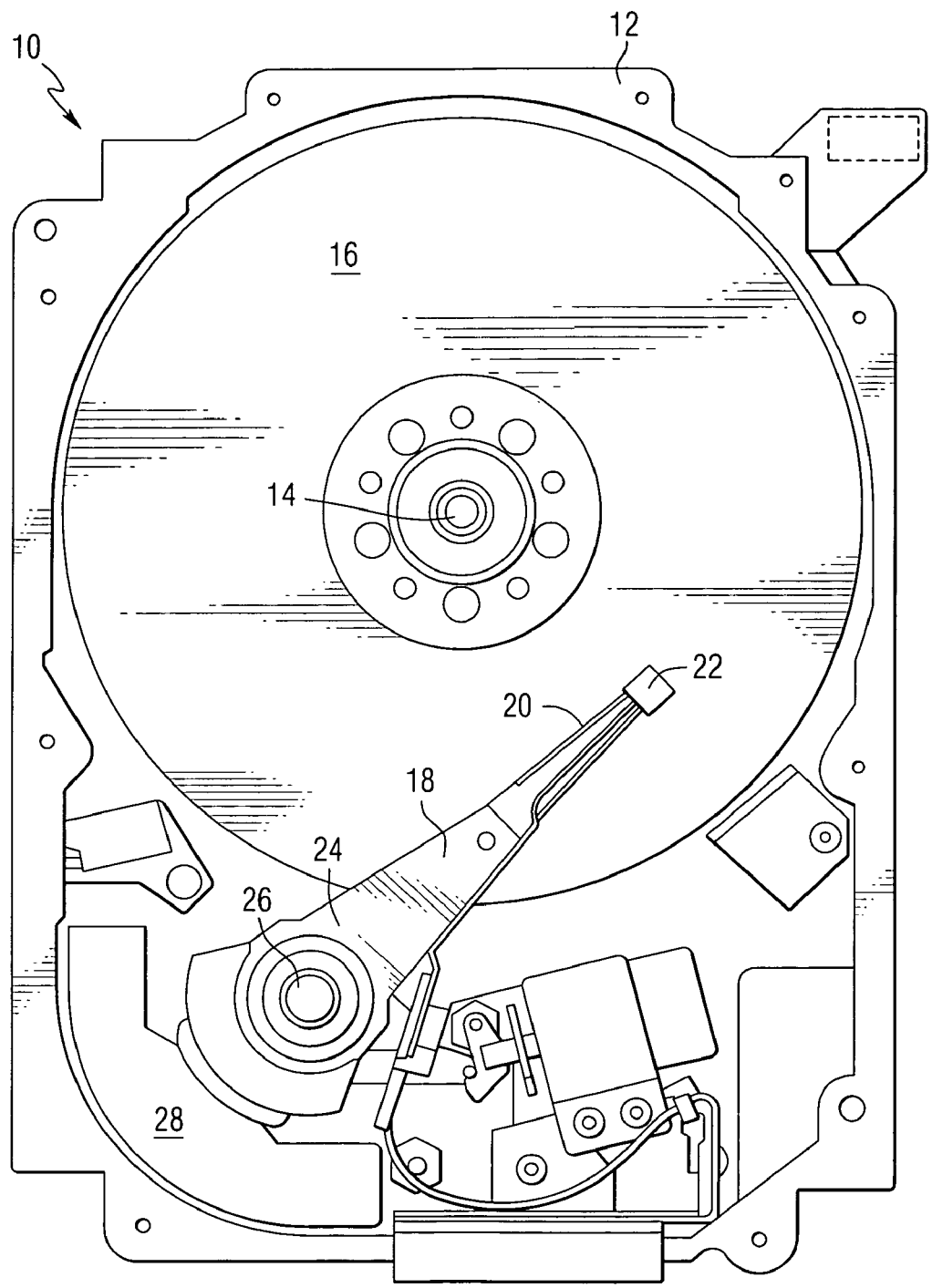
FIG. 1 is a pictorial representation of a magnetic disc drive that can include transducers constructed in accordance with this invention.

This invention encompasses transducers that can be used in magnetic and optical recording heads for use with magnetic and/or optical recording media, as well as magnetic and/or optical recording heads that include such devices and disc drives that include the transducers. FIG. 1 is a pictorial representation of a disc drive 10 that can utilize transducers constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, an electromagnetic wave of, for example, visible, infrared, or ultraviolet light is directed onto a surface of a data storage medium to raise the temperature of the localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMs) have been described in the literature. SILs and SIMs may be either three-dimensional or two-dimensional. In the latter case they correspond to mode index lenses or mirrors in planar waveguides. A metal pin can be inserted at the focus of a SIM to guide a confined beam of light out of the SIM to the surface of the recording medium. This invention provides transducers that include metal pins.

Figure 2:
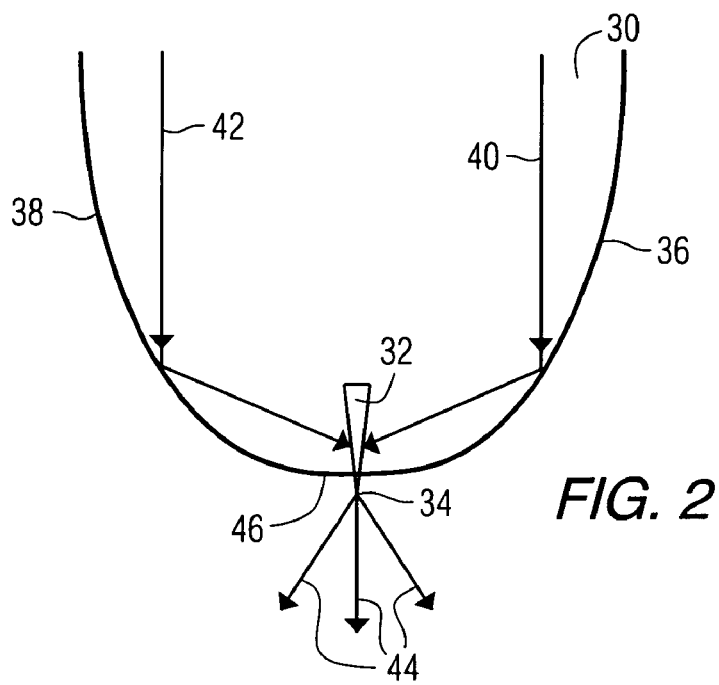
FIG. 2 is a schematic representation of a transducer constructed in accordance with this invention.

Two-dimensional planar waveguides can be used to generate focused beams by means of mode index lenses or planar solid immersion mirrors. FIG. 2 is a schematic representation of a two-dimensional waveguide 30 in the form of a solid immersion mirror, including a metal pin 32 embedded in an end of the waveguide. The tip 34 of the pin extends beyond the waveguide. The waveguide includes edges 36, 38 having a substantially parabolic shape in the example shown in FIG. 2. Due to differences in refractive index between the waveguide and the adjacent material, an electromagnetic wave traveling in the axial direction through the waveguide as illustrated by arrows 40 and 42 would be reflected by the waveguide onto the surface of the metal pin. If the electric field at the focal point is parallel to the axis of the pin then it can couple to the pin and generate surface plasmons along the surface of the pin. Near field radiation then emanates from the tip of the pin as illustrated by arrows 44. The metal pin placed at the focus concentrates the light to a much smaller spot than would be possible with a mode index lens or SIM alone. The waveguide can be truncated at the end 46 adjacent to the pin so that most of the incoming electromagnetic wave strikes the edges of the waveguide at an angle less than some predetermined angle, such as 45°. For a linearly polarized collimated electromagnetic wave, edges having a parabolic shape will focus the wave to a focal point. However, it should be understood that other edge shapes can be used if the incoming wave is conditioned such that the combination of the wave characteristics and the edge shape result in the desired focusing of the wave at the pin. The pin can have a rectangular cross-section and can be tapered to a point. However, pins having other cross-sectional shapes can also be used.

The waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. The waveguide also contains dielectric cladding layers on either side of the core. The cladding layer must have a lower refractive index than the core layer. Preferably the difference in refractive index between the core and cladding should be as large as possible. Air is a suitable dielectric for one side of the cladding. Other dielectrics that could be used as cladding layers include $SiO_2$ with an index of 1.5 and $Al_2O_3$ with an index of about 1.8.

Figure 3:
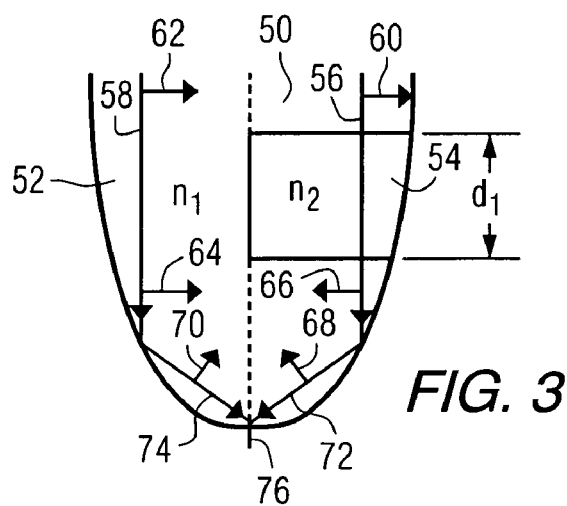
FIG. 3 is a schematic representation of another transducer constructed in accordance with this invention.

When a transverse electric (TE) mode electromagnetic wave is used, means can be provided to phase shift a portion of the electromagnetic wave. This phase shift can be achieved by providing a means for launching the two-dimensional analog of a radially polarized wave into the planar waveguide. This can be referred to as a split linear polarization waveguide mode. Two methods are described below for achieving the split linear polarization. The first technique modifies half of the planar waveguide by changing the refractive index of the core or cladding dielectrics and/or the thickness of the core or cladding dielectrics in the waveguide in one section as shown in FIG. 3. The planar waveguide 50 of FIG. 3 includes a first section 52 of the core dielectric having an effective index of refraction of $n_1$ (which is a function of the index of refraction and thickness of all core and cladding layers in the waveguide), and a second section 54 of the core dielectric having an effective index of refraction of $n_2$. The length of section 54 in an axial direction is designated as $d_1$. Light enters the waveguide as illustrated by arrows 56 and 58. The incident light is linearly polarized in the plane of the waveguide. Arrows 60, 62, 64, 66, 68 and 70 illustrate the electric field of the incident light. Arrows 60 and 62 show that the electric field component of the incident light initially lies in the plane of the waveguide for transverse electric polarization. Section 54 of the waveguide causes a differential phase shift between the waveguide mode in the two halves of the waveguide such that the electromagnetic field of light exiting section 54, as illustrated by arrow 66, is 180° out of phase with respect to light passing through section 52, as illustrated by arrow 64. As the light is reflected at the edges of the waveguide, the reflected waves illustrated by arrows 72 and 74 have electric fields as illustrated by arrows 68 and 70 that include both longitudinal and transverse components in the case of TE polarization. Where the reflected waves meet, the transverse components cancel, leaving the longitudinal components that add to produce an electric field that is axially aligned with the waveguide and used to excite surface plasmons on the metal tip 76. This axial field is desirable to improve the fraction of energy that is coupled to the pin.

The time required for the electromagnetic wave to propagate through a section of waveguide is determined by the effective refractive index and length of the section. The refractive index and length can be chosen so that there is a net phase shift of 180° between the wave propagating through the first section and the wave propagating through the second section. This can be represented by, $$|(n_1 - n_2)d| = \frac{\lambda}{2} \tag{1}$$

where $n_1$ and $n_2$ are the effective refractive indices of the TE waveguide mode in the first and second sections, d is length of the second section, and $\lambda$ is the wavelength of the incident electromagnetic radiation. The effective refractive index is a function of the core and cladding refractive indices and thicknesses as well as the polarization state. There are many ways to get the index change $n_2$ in the structure of FIG. 3. For example, the index can be changed by varying the thickness of the waveguide, using ion implantation, or strip loading the waveguide with a metal, etc.

Figure 6:
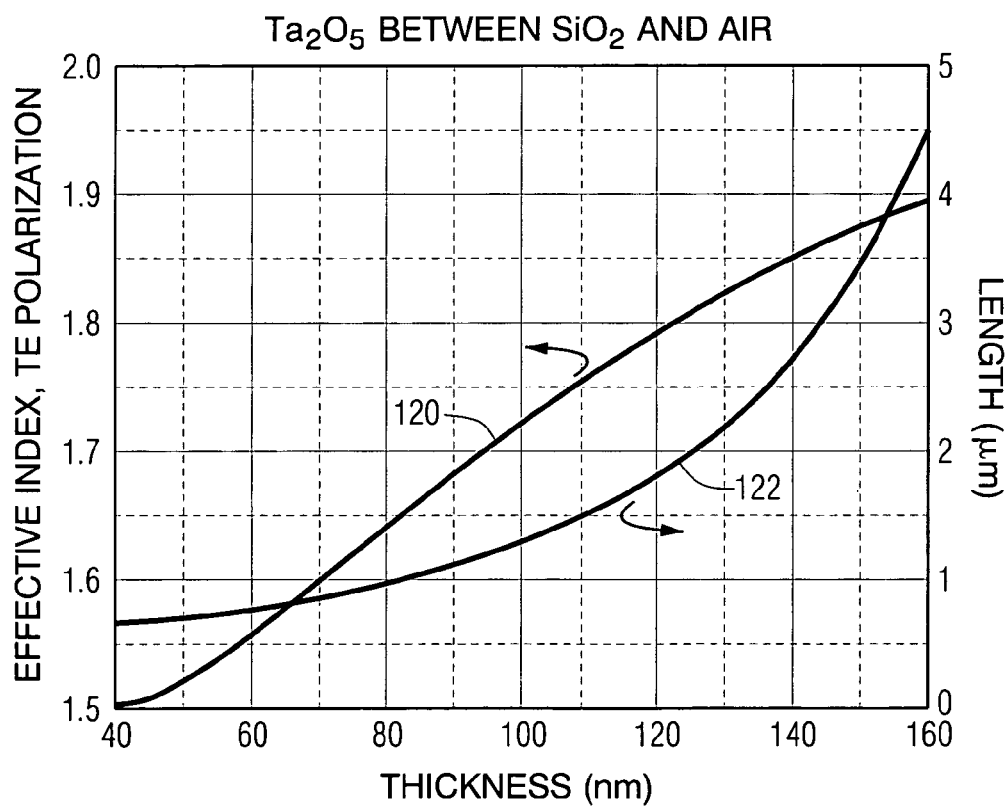
FIG. 6 is a graph of thickness vs. effective index.

Referring to the structure of FIG. 3, if the planar waveguide is comprised of $Ta_2O_5$ with a thickness of 200 nm, then the required length for the modified section is a function of $Ta_2O_5$ film thickness as shown by line 122 of the graph of FIG. 6. For example, a $Ta_2O_5$ film with a thickness of 100 nm would have an effective index of 1.76 and the section length 54 should be about 1.2 μm long in order to generate a net phase shift of 180°. Alternatively, the entire waveguide could start with a $Ta_2O_5$ thickness of 100 nm, and a 1.2 μm long modified section 54 of 200 nm thick $Ta_2O_5$ could be used instead. This would also generate a 180° phase shift.

Figure 4:
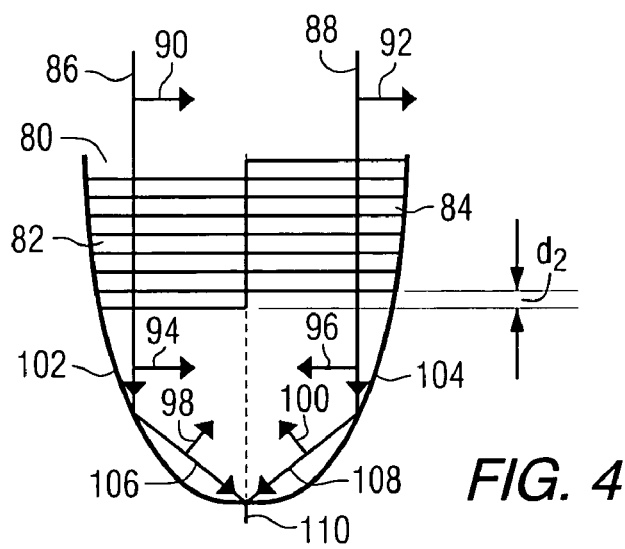
FIG. 4 is a schematic representation of another transducer constructed in accordance with this invention.

An alternative technique for generating a split linearly polarized planar waveguide mode makes use of a diffraction grating to launch the planar mode, as illustrated in FIG. 4. FIG. 4 shows a two-dimensional waveguide 80 in the form of a solid immersion mirror, including first and second diffraction gratings 82 and 84. Diffraction gratings are commonly used to inject light into a planar waveguide. To generate split linear polarization, the two diffraction gratings 82 and 84 are used with a longitudinal offset between them as shown in FIG. 4. The diffraction gratings are offset by a distance $d_2$.

Figure 5:
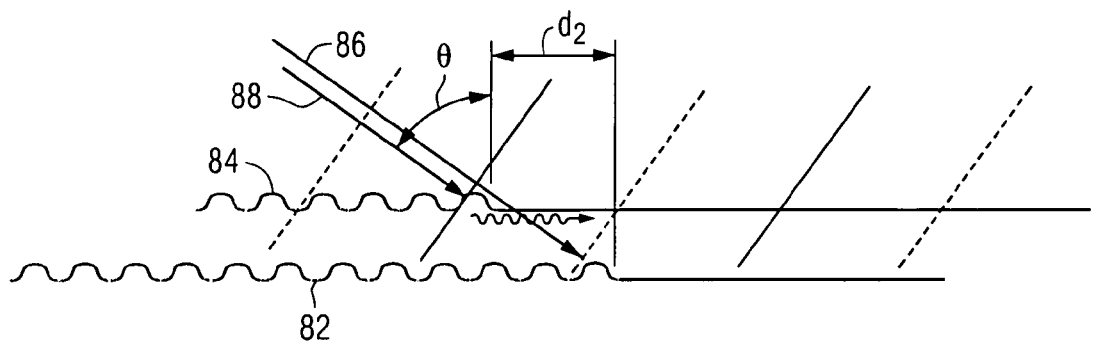
FIG. 5 is a schematic representation of two diffraction gratings.

The purpose of the dual grating is to introduce a relative 180° phase shift between the two halves of the beam. Arrows 86 and 88 illustrate an incident electromagnetic wave having an electric field represented by arrows 90, 92, and a transverse electric waveguide mode having an electric field represented by arrows 94, 96, 98 and 100. As shown by arrows 90 and 92, the electric field of the incident wave is initially linearly polarized in the plane of the waveguide for TE modes. Grating 82 is used to launch the wave into one half of the waveguide. Grating 84 is used to launch the wave into the other half of the waveguide. The longitudinal offset in the position of the two gratings causes a 180° phase shift to occur between the two waveguide modes as shown by arrows 94 and 96. After reflection from the edges 102 and 104 of the waveguide, the reflected waves as illustrated by arrows 106 and 108 have electric fields that include both longitudinal and transverse components in the case of TE polarization. When the reflected waves meet at the focal point, the transverse components of the electric fields cancel and the longitudinal components of the electric fields add. This excites surface plasmons on the pin 110. The offset between the gratings is given by the formula:

$$\text{offset} = \frac{\lambda}{2(n_{\text{eff}} - n_{\text{inc}} \sin\theta)} \quad (2)$$

where $\theta$ is the angle of incidence, $n_{\text{eff}}$ is the effective index of refraction for the waveguide mode, and $n_{\text{inc}}$ is the refractive index of the incident medium. As shown in FIG. 5 the incident collimated laser beam reaches the end of the first portion of the waveguide before it reaches the end of the second portion of the waveguide. The time difference is:

$$t_1 = \frac{n_{\text{inc}} d \sin\theta}{c}. \quad (3)$$

At the end of the first grating the waveguide mode begins propagating with a phase velocity of $$v_p = \frac{c}{n_{\text{eff}}}. \quad (4)$$

It reaches the end of the second grating after the interval $$t_2 = \frac{n_{\text{eff}} d}{c}. \quad (5)$$

The time interval between $t_1$ and $t_2$ is sufficient to generate a 180° phase shift in the propagating waveguide mode, $$t_2 - t_1 = \frac{d}{c}(n_{\text{eff}} - n_{\text{inc}} \sin\theta) = \frac{1}{2f} = \frac{\lambda}{2c}. \quad (6)$$

This equation reduces to Equation (2).

The waveguide can be positioned on a surface of a substrate of, for example, $SiO_2$. For a waveguide constructed as shown in FIG. 4, for TE polarization at a wavelength of 400 nm, the effective index of refraction of a 40 nm $Ta_2O_5$ waveguide on an $SiO_2$ substrate is 1.553. For a 45° angle of incidence in air of the collimated laser beam onto the waveguide, the offset should be 236 nm. As a second example, for TE polarization at a wavelength of 633 nm and a 50 nm $Ta_2O_5$ waveguide on an $SiO_2$ substrate, the effective index is 1.469, so the offset should be 415 nm for a 45° angle of incidence of the laser beam in air. As a third example, for TE polarization at a 1550 nm wavelength and a 100 nm Si waveguide on an $SiO_2$ substrate, the effective index is 2.129, so the offset should be 545 nm for a 45° angle of incidence of the laser beam in air.

FIG. 5 is a schematic representation of the two diffraction gratings 82 and 84 of FIG. 4. FIG. 5 shows the grating offset and the incident light represented by arrows 86 and 88.

FIG. 6 is a graph of the effective index 120 for a waveguide comprised of a $Ta_2O_5$ core (n=2.2) sandwiched between $SiO_2$ (n=1.5) and air cladding layers at a wavelength of 633 nm for TE polarization vs. thickness of the waveguide. As the film gets very thick its effective index approaches that of the bulk $Ta_2O_5$, i.e. 2.2. As the film gets very thin, its effective index drops towards that of the $SiO_2$ substrate, i.e. 1.5. For film thicknesses below about 40 nm there are no propagating TE modes.

Figure 7:
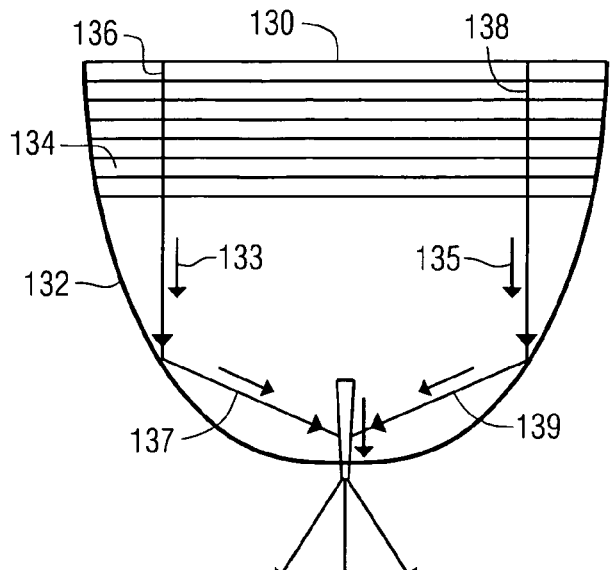
FIG. 7 is a schematic representation of another transducer constructed in accordance with this invention.

Another way of exciting the pin with a strong z-polarization is to excite a TM mode in the waveguide near the cutoff dimension of the waveguide rather than the TE mode as discussed above. A waveguide that uses a TM mode is illustrated in FIG. 7. The planar waveguide 130 of FIG. 7 includes a layer 132 of transparent material such as $Ta_2O_5$ on a surface of a substrate, such as $SiO_2$. A single grating 134 is provided for coupling light into the waveguide. Light enters the waveguide as illustrated by arrows 136 and 138. The incident light is polarized in the plane of incidence and perpendicular to the plane of the waveguide so that the electric field within the waveguide has a component that lies in the plane of the waveguide along the direction of propagation as shown by arrows 133 and 135, and another component that lies perpendicular to both the direction of propagation and the plane of the waveguide. This is illustrated in a side view in FIG. 9. The electric field component which lies along the direction of propagation is $E_z$, and the electric field component which is perpendicular to the direction of propagation and the plane of the waveguide is $E_y$. After reflecting from the edge of the waveguide, the electric field component $E_y$ is unchanged, but the electric field component $E_z$ is divided into a longitudinal component parallel to the pin, $E_L$, and a transverse component, $E_T$, perpendicular to the pin. Where the reflected waves 137 and 139 in FIG. 7 meet, the electric fields add together to generate a total electric field which has one component parallel to the pin, $E_L$, and another component perpendicular to both the waveguide and the pin (denoted by $E_y$ in FIG. 9). The transverse field components, $E_T$, cancel. As the thickness of the core is reduced towards the cutoff thickness, the component $E_L$ of the electric field, which lies parallel to the pin, increases relative to the component $E_y$ that lies perpendicular to both the plane of the waveguide and the pin. Because the component that lies perpendicular to the pin does not efficiently couple into the pin, the waveguide should be designed to operate near its cutoff for which the amplitude of the electric field component in the plane of the waveguide is maximized in order to transfer electromagnetic energy most efficiently into the pin.

Figure 8:
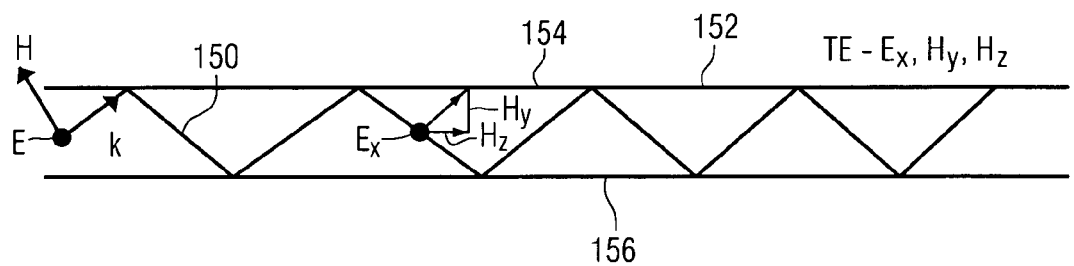
FIG. 8 is a schematic representation of a TE mode wave in a waveguide.

FIG. 8 is a schematic representation of a TE mode wave in a waveguide. In FIG. 8, an electromagnetic wave 150 is shown within a waveguide 152. The electromagnetic wave is polarized in the TE mode such that the electric field is perpendicular to the plane of the figure and the magnetic field H has components $H_y$ and $H_z$, with component $H_z$ lying in a direction parallel to the axis of the waveguide. The electromagnetic wave can be seen to reflect off of the sides 154 and 156 as it travels along the waveguide.

Figure 9:
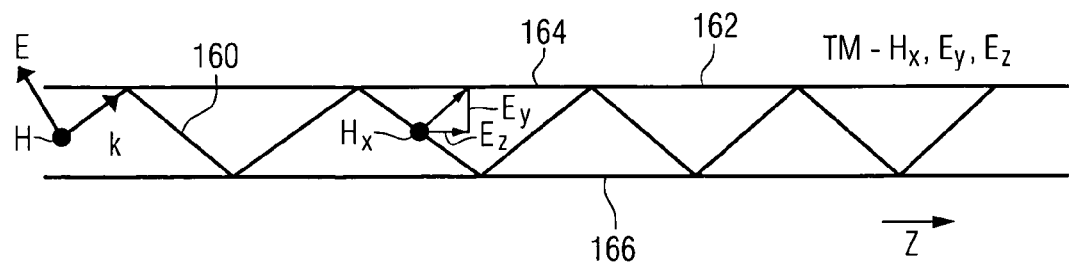
FIG. 9 is a schematic representation of a TM mode wave in a waveguide.

FIG. 9 is a schematic representation of a TM mode wave in a waveguide. In FIG. 9, an electromagnetic wave 160 is shown within a waveguide 162. The electromagnetic wave is polarized in the TM mode such that the magnetic field is perpendicular to the plane of the figure and the electric field E has components $E_y$ and $E_z$, with component $E_z$ lying in a direction parallel to the axis of the waveguide. The electromagnetic wave can be seen to reflect off of the sides 164 and 166 as it travels along the waveguide.

From FIGS. 8 and 9 it is apparent that for the TM mode, there is a component of the electric field in the z-direction. The closer the mode is to cutoff, the stronger the z-component. The TM mode can be excited by a single grating and does not require the offset grating shown in FIG. 4. By using a TM mode, the phase shifting means of FIG. 4 can be eliminated.

For some transducers it is desirable to use a radially polarized electromagnetic wave. Radial polarization may be understood by referring to FIG. 10. A radially polarized electromagnetic wave includes an electric field component that lies in a plane 170 that is perpendicular to the direction of travel represented by a k vector 172, and is represented by arrows 174, 176, 178 and 180.

Figure 11:
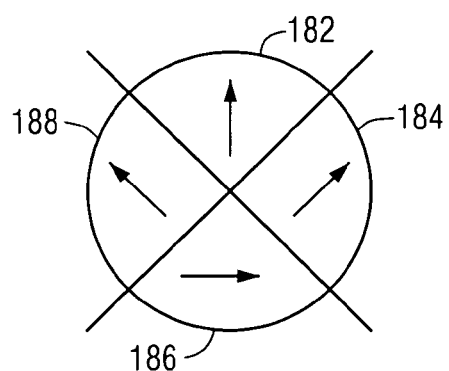
FIG. 11 is a schematic representation of a composite wave plate for generating radial polarization.

The magnetic field, H, for a radially polarized wave is circumferential with respect to the k vector. Techniques for generating a radially polarized wave are well-known. For example, two half-wave plates can be cut into quarters 182, 184, 186 and 188 and rearranged into a single wave plate with fast axes as shown in FIG. 11.

Figure 12:
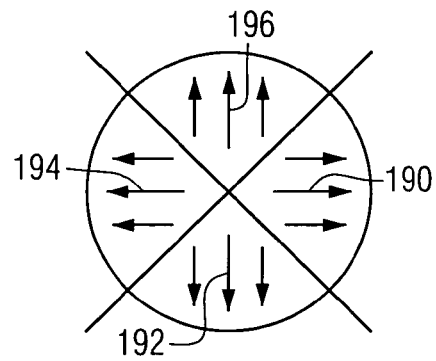
FIG. 12 is a schematic representation of pseudo-radial polarization for the light transmitted by the wave plate.

A half wave plate has the property that it rotates the plane of polarization by twice the angle of the wave plate. Therefore, if a plane wave uniformly polarized in the vertical direction is incident upon the modified wave plate, the transmitted polarization will be as illustrated by the arrows 190, 192, 194 and 196 in FIG. 12.

Figure 10:
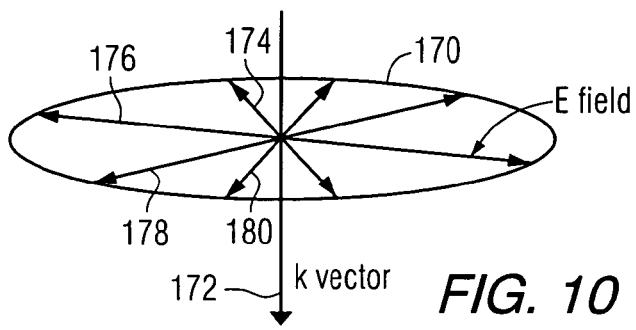
FIG. 10 is a schematic illustration of radial polarization in an electromagnetic wave.

The transmitted polarization has a strong radial component and a smaller circumferential component. The circumferential component can be eliminated by focusing the beam through a spatial pinhole filter which strongly attenuates the circumferential components relative to the radial components. The result will be a radially polarized beam as shown in FIG. 10. There are other methods for generating radially polarized beams as well.

Figure 13:
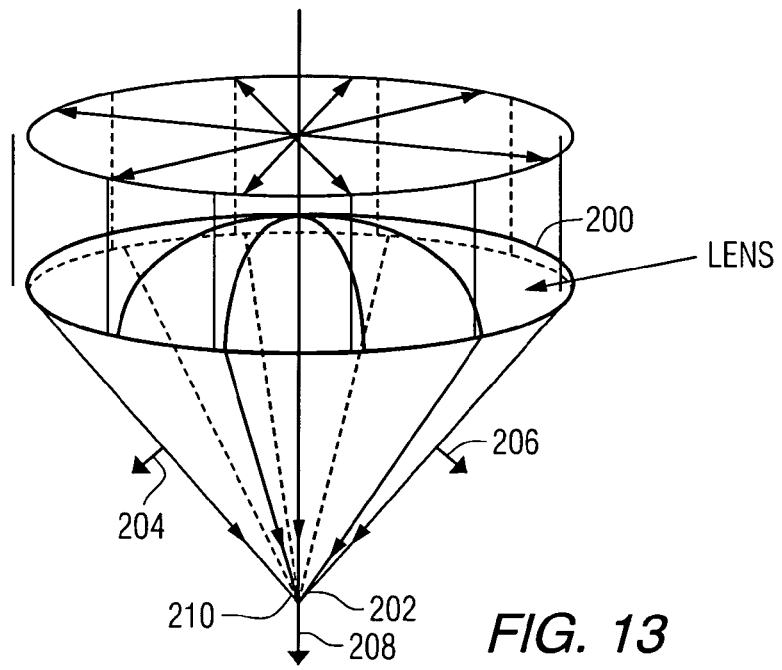
FIG. 13 is a schematic illustration of a radially polarized beam incident upon a solid immersion lens.

If this radially polarized beam is incident upon either a solid immersion lens (SIL) or a solid immersion mirror (SIM) it will be brought to a focus. FIG. 13 is a schematic representation of a SIL 200 that is used to focus a radially polarized wave. At the focus 202, the components of the electric field, illustrated by arrows 204, 206, tend to cancel, leaving only an electric field component that lies along the axis of propagation 208.

Figure 14:
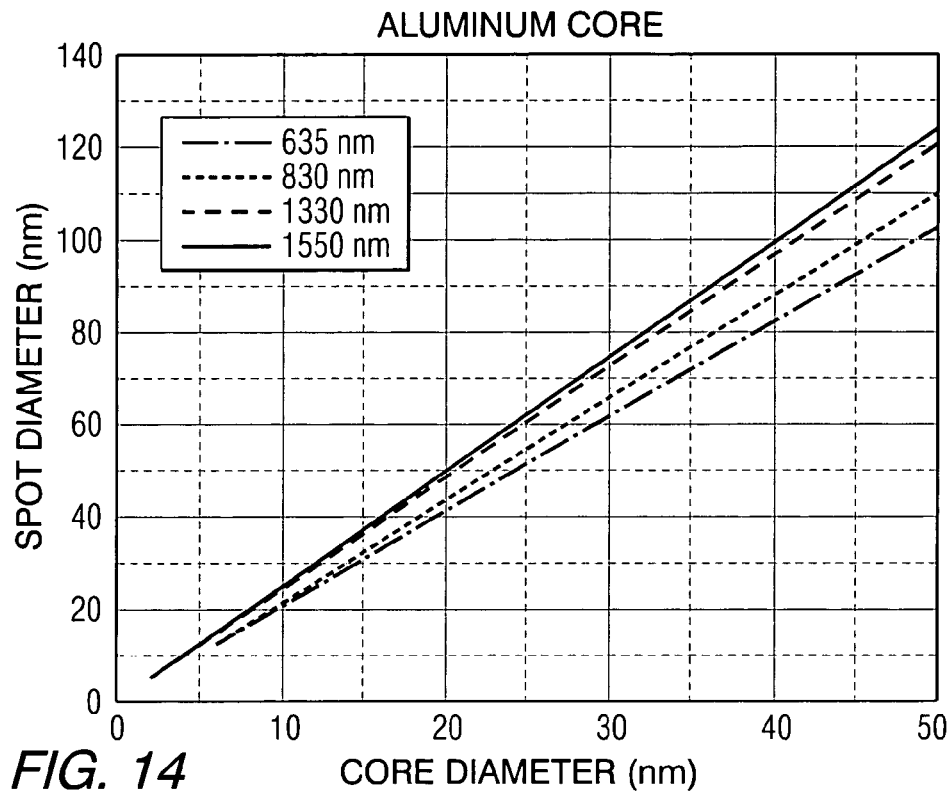
FIG. 14 is a graph of spot diameter vs. core diameter.

This axial electric field polarization for either a SIL or a SIM can be used in combination with a metal pin 210 at the focus to provide a reduced size optical spot with improved throughput efficiency. The pin does not need to be very long, only on the order of the depth of focus or about a wavelength. The length of the pin can be optimized to support a resonant mode and radiate light efficiently from its lower end. The metal pin can support a surface plasmon resonance propagating along it axially. The field can be tightly confined by making the diameter of the pin small. However, as the diameter of the pin is reduced, the propagation length of the SP mode also decreases. For an aluminum pin the diameter of the spot as a function of the diameter of the pin is shown in FIG. 14. For a 50 nm spot size the metal pin should be about 20 nm in diameter. The data in FIG. 14 is for an infinite cylindrical pin. For a finite cylinder or a pointed pin, the spot size will be similar or even smaller.

Figure 15:
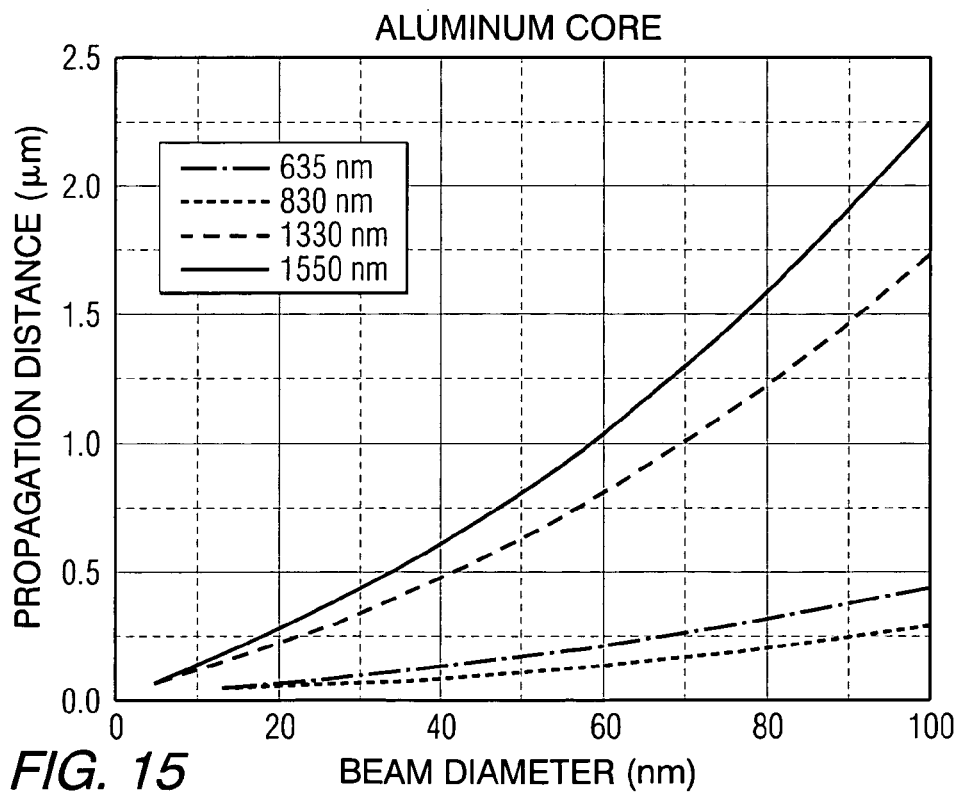
FIG. 15 is a graph of beam diameter vs. propagation distance.

The propagation length as a function of pin diameter is shown in FIG. 15. The propagation length is defined as the distance for which the amplitude of the wave drops to 1/e of its initial value. A pin diameter of 20 nm corresponds to a propagation distance of only ~300 nm at a wavelength of 1550 nm. For these calculations the metal pin is surrounded by a dielectric with index=2.2.

In order to allow the SP mode to propagate a longer distance, the pin could be cone shaped with its point near the bottom of the SIL or SIM. As the diameter of the pin increases the propagation length of the SP mode also increases. So energy, which is incident upon the conical pin at the end opposite that of the point, would be able to propagate more easily to the point.

Figure 16:
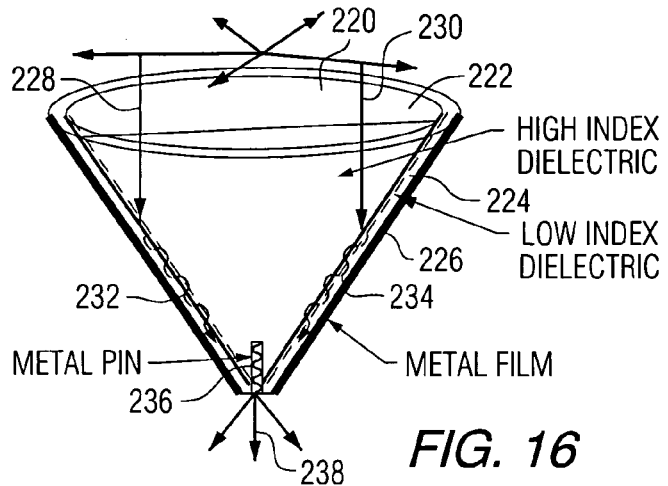
FIG. 16 is a schematic representation of a conical transducer constructed in accordance with this invention.

Different kinds of aperture probes can also be combined with radially polarized light and a metal pin transducer to confine the power. A three-dimensional design is illustrated in FIG. 16. The structure of FIG. 16 includes a tapered cylindrically symmetric optical fiber 220 comprising a generally cone shaped section of high dielectric material 222, and a layer of low dielectric material 224 on an outer surface of the high dielectric material. A thin film coating of metal 226 is deposited on the surface of the low dielectric material. When light enters the structure as shown by arrows 228 and 230, surface plasmons 232 and 234 are generated along the interface between the low dielectric material and the metal layer. The surface plasmons are used to excite a metal pin 236 that radiates the electromagnetic wave as illustrated by arrows 238. The surface plasmon modes propagate along the outer walls of the fiber. The taper angle is chosen in conjunction with the thin films to optimally excite the SP mode with collimated and radially polarized light.

Figure 17:
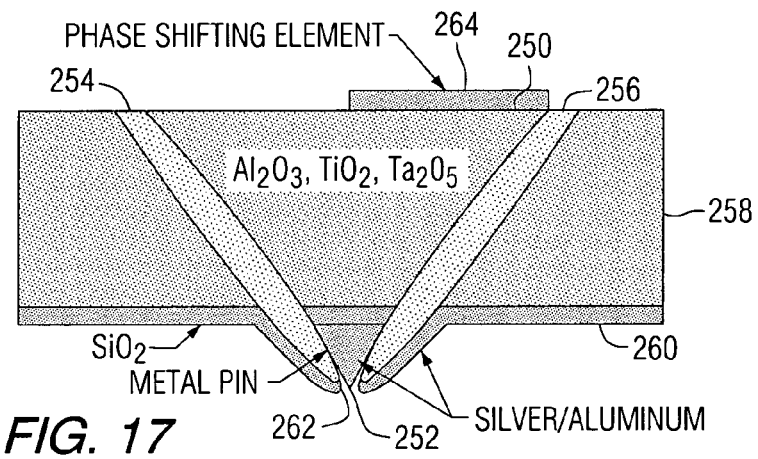
FIG. 17 is a schematic representation of a pyramidal transducer constructed in accordance with this invention.

Another design, illustrated in FIG. 17, is based on commercially available pyramidal hollow metal aperture probes. To construct the waveguide of this invention, the fabrication process must be modified to produce the metal pin. The structure of FIG. 17 includes a four-sided transparent dielectric pyramid 250 having a metal pin 252 located at a tip thereof. The dielectric pyramid may be composed of a high index dielectric like $Ta_2O_5$ or $TiO_2$ or a low index dielectric like $SiO_2$ or $Al_2O_3$. A second transparent low index dielectric material indicated by 254 and 256 is coated over the pyramid and metal pin. This dielectric material may be $SiO_2$. The resulting structure is embedded in a substrate 258. The pin and ends of the dielectric layers protrude from a surface of the substrate. A layer 260 of metal, such as silver or aluminum, is positioned on the surface of the substrate and adjacent to the protruding portions of the dielectric layer 254 and 256. An opening 262 is provided adjacent to the tip of the metal pin. A phase shifting element 264 can be included as shown in FIG.

17 to serve the same function as the phase shifting elements described in FIGS. 3 and 4, that is, to convert a linearly polarized waveguide mode into a split linear polarization. Two-dimensional structures such as the waveguide of FIG. 17 can also be readily fabricated using conventional micro-electromechanical systems technologies that rely on tapering rather than on focusing by parabolic or ellipsoidal structures. In each case, split linearly polarized light or radially polarized light can be used to effectively launch a SP on the metal pin that is to be used to transfer/confine the optical power.

Figure 18:
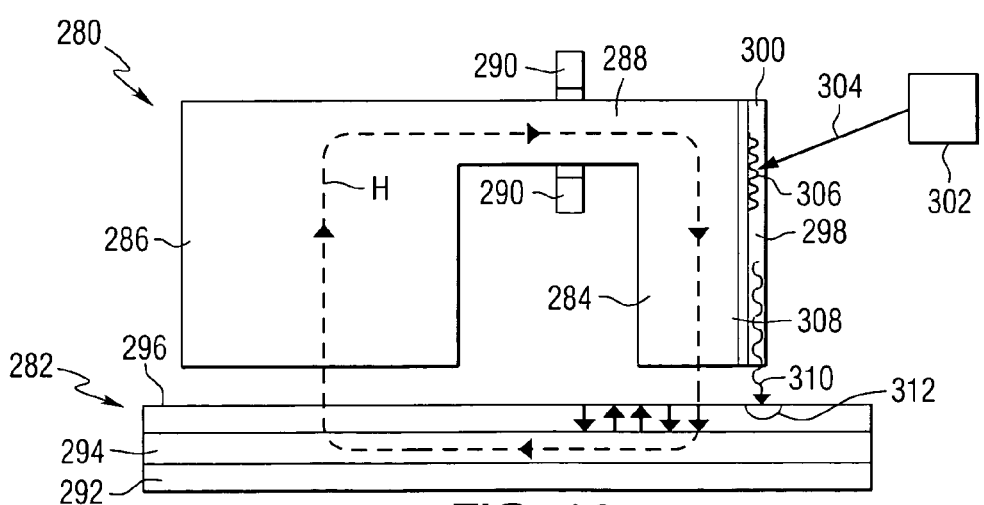
FIG. 18 is a schematic representation of a recording head including a transducer of this invention.

FIG. 18 is a partially schematic side view of a heat assisted magnetic recording head 280 and a magnetic recording medium 282. Although an embodiment of the invention is described herein with reference to recording head 280 as a perpendicular magnetic recording head and the medium 282 as a perpendicular magnetic recording medium, it will be appreciated that aspects of the invention may also be used in conjunction with other types of recording heads and/or recording mediums where it may be desirable to employ heat assisted recording. Specifically, the recording head 280 may include a writer section comprising a main write pole 284 and a return or opposing pole 286 that are magnetically coupled by a yoke or pedestal 288. It will be appreciated that the recording head 280 may be constructed with a write pole 284 only and no return pole 286 or yoke 288. A magnetization coil 290 surrounds the yoke or pedestal 288 for energizing the recording head 280. The recording head 280 also may include a read head, not shown, which may be any conventional type read head as is generally known in the art. The waveguide can alternatively be positioned on the other side of the pole. In another example, the pin and the pole can be the same material, in which case the pin can function as both the electromagnetic transducer and the source of the field.

Still referring to FIG. 18, the recording medium 282 is positioned adjacent to or under the recording head 280. The recording medium 282 includes a substrate 292, which may be made of any suitable material such as ceramic glass or amorphous glass. A soft magnetic underlayer 294 is deposited on the substrate 292. The soft magnetic underlayer 294 may be made of any suitable material such as, for example, alloys or multilayers having Co, Fe, Ni, Pd, Pt or Ru. A hard magnetic recording layer 296 is deposited on the soft underlayer 294, with the perpendicular oriented magnetic domains contained in the hard layer 296. Suitable hard magnetic materials for the hard magnetic recording layer 296 may include at least one material selected from, for example, FePt or CoCrPt alloys having a relatively high anisotropy at ambient temperature.

The recording head 280 also includes a planar waveguide 298 that directs light received from a light source onto a surface of a recording medium to heat the magnetic recording medium 282 proximate to where the write pole 284 applies the magnetic write field H to the recording medium 282. The planar waveguide includes a light transmitting layer 300. The optical waveguide 298 acts in association with a light source 302 which transmits light, for example via an optical fiber 304, that is coupled to the optical waveguide 298, by a coupling means such as a grating 306. The light source 302 may be, for example, a laser diode, or other suitable laser light sources. This provides for the generation of a guided mode that may propagate through the optical waveguide 298 toward the recording medium. EM radiation, generally designated by reference number 310, is transmitted from the waveguide 298 for heating the recording medium 282, and particularly for heating a localized area 312 of the recording layer 296.

The optical waveguide 298 can be constructed in accordance with any of the waveguides set forth in FIGS. 2, 3, 4, 7, 16 or 17.

The transducers of this invention can also be used in optical recording applications in which either a magnetic field is not needed, such as write once and phase change recording, or where an external magnet could be positioned below the substrate, such as in magneto-optic recording. Alternatively, these structures could potentially be useful in a probe storage application.

Figure 19:
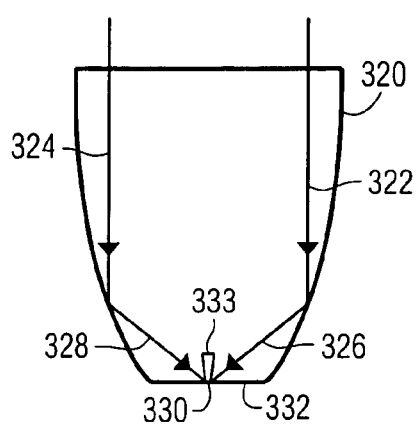
FIG. 19 is a schematic representation of a transducer including a truncated solid immersion mirror constructed in accordance with this invention.
Figure 20:
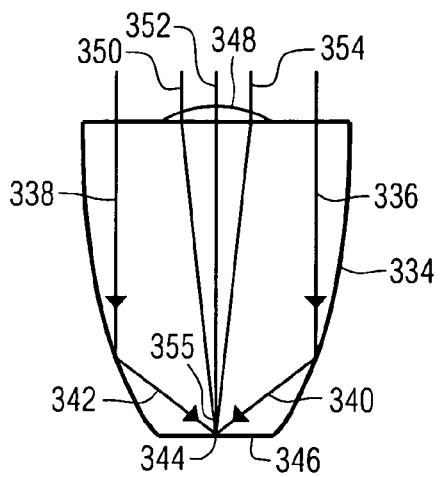
FIG. 20 is a schematic representation of another transducer including a truncated solid immersion mirror constructed in accordance with this invention.

This invention also encompasses transducers that include three-dimensional waveguides as illustrated in FIGS. 19 and 20. FIG. 19 is a schematic representation of a transducer that includes a truncated solid immersion mirror 320 constructed in accordance with this invention. Electromagnetic waves enter the SIM as illustrated by arrows 322 and 324 and are reflected off of the sides as illustrated by arrows 326 and 328. This focuses the light at a focal point 330. The focal point is positioned adjacent to a truncated edge 332 of the SIM. A metal pin 333 is positioned adjacent to, or at, the focal point.

FIG. 20 is a schematic representation of another truncated solid immersion mirror 334. Electromagnetic waves enter the SIM as illustrated by arrows 336 and 338 and are reflected off of the sides as illustrated by arrows 340 and 342. This focuses the light at a focal point 344. The focal point is positioned adjacent to a truncated edge 346 of the SIM. A focusing means 348 is positioned to focus electromagnetic waves that enter near the center of the input edge of the SIM, as illustrated by arrows 350, 352 and 354. A metal pin 355 is positioned adjacent to, or at, the focal point.

The SIMs of FIGS. 19 and 20 use total internal reflection to direct the light rays from an incident collimated beam of light towards a focal point at the bottom surface of the SIM. Because all of the rays converge within the high index medium of the SIM, the minimum spot size is equivalent to that of a solid immersion lens. However, there are no longer practical difficulties in feeding the SIM or mounting the SIM, so the minimum spot size realized in practice is much closer to the theoretical limit.

The structures of FIGS. 19 and 20 are truncated solid immersion mirrors in which there is no refraction except at the top lens surface in FIG. 20, but instead, rays are redirected by total internal reflection to the focus of the mirror. Light rays which enter a parabolic mirror parallel to the optical axis of the parabola are brought into focus at the focal point of the parabola as shown in FIGS. 19 and 20. The truncated parabolic lens is made of a material which has a high index of refraction compared to the surrounding medium. The lens is truncated at a plane which cuts through the focal point of the lens. The maximum angle of incidence of the marginal ray on the parabolic surface varies. In the embodiment of FIG. 19 it is 45°. In order to ensure total internal reflection for all rays in the incident beam, the critical angle equation must be satisfied as follows.

$$n_{med} = n_{SIL} \sin \theta_{max} = \sqrt{2} \cdot n_{SIL} \qquad (7)$$

If the SIM is made of glass with an index of refraction of 1.5, then the surrounding medium can be air, with N=1, and all light rays striking the parabolic curve of the SIM will be totally reflected. In order to efficiently reflect light rays incident below the critical angle, the surface of the SIM in the region below the critical angle would need to be coated with a metallic reflector like silver or aluminum.

There is a region in the center of the embodiment of FIG. 19 where incident light does not contribute to the focused spot. It is possible to shape the top surface of the SIM, or to affix a second plano-convex lens to this surface, to also focus these rays as shown in FIG. 20. However, these low angle rays are not as important for generating a small focused spot. The SIM can also be fabricated from a material with a graded refractive index in the radial direction to both focus the light in the center region of the SIM and to reduce the critical angle required for total internal reflection. However, doing this would make the SIM dispersive and monochromatic light would be required.

The truncated parabolic SIM design can be easily mounted at its top edge without interfering with the incident high angle rays. The lens should be essentially achromatic because the light rays are reflected rather than refracted (except for the top surface plano-convex lens if present), and the angle of reflection is independent of wavelength or refractive index. Finally, another advantage of this design is that often the incident collimated beam has a Gaussian intensity profile. In a conventional SIL design, the outer highest angle light rays which are the most important for generating the smallest spot size are generated from the edges of the Gaussian beam with the lowest intensity. In this parabolic SIM design, however, the highest angle rays reflected to the focal point come from nearer to the center of the incident beam and, therefore, will have a higher intensity.

It is also possible that the waveguide can include only one parabolic edge and another edge that is a different shape, such as straight. This structure could enable some head geometries that might be more amenable to fabrication.

Figure 21:
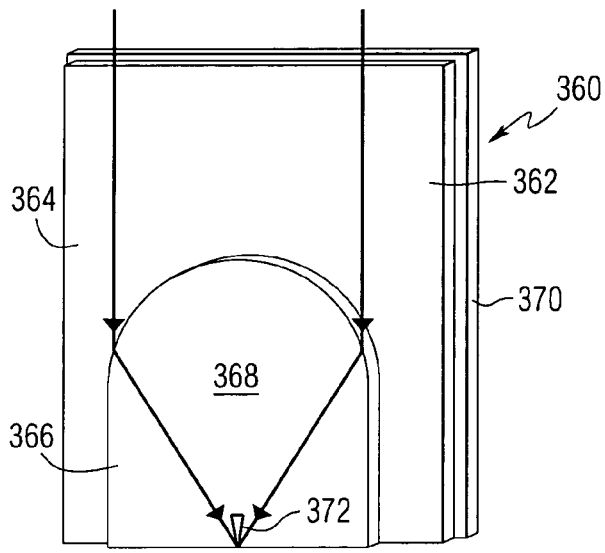
FIG. 21 is an isometric view of another transducer constructed in accordance with this invention.

FIG. 21 is an isometric view of another transducer 360 constructed in accordance with this invention. Transducer 360 includes a waveguide core layer 362 having a first portion 364 of a first thickness and a second portion 366 of a second thickness and shaped to form a mode index lens 368. A cladding layer 370 is positioned adjacent to one side of the waveguide. A pin 372 is positioned at the focal point of the mode index lens.

Figure 22:
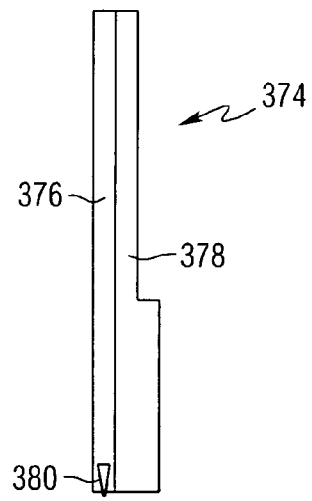
FIG. 22 is a side elevation view of another transducer constructed in accordance with this invention.

FIG. 22 is a side elevation view of another waveguide 374 constructed in accordance with this invention. Waveguide 374 includes a core layer 376 and a cladding layer 378 is positioned adjacent to one side of the waveguide. The thickness of the cladding layer can be varied to provide a means for phase shifting the electromagnetic wave in the waveguide. Pin 380 is positioned at the focal point of the waveguide. It should be recognized that the cladding layer can be positioned on either one side or both sides of the core layer.

The excitation of plasmon modes in a metallic pin by radial polarized light leads to an electric field distribution below this pin that strongly depends on the pin size and the distance from the pin. The temperature profile within the recording medium is of crucial importance for heat assisted magnetic recording (HAMR). It governs not only the transition width and curvature but also the maximum temperature required for writing.

Figure 23A:
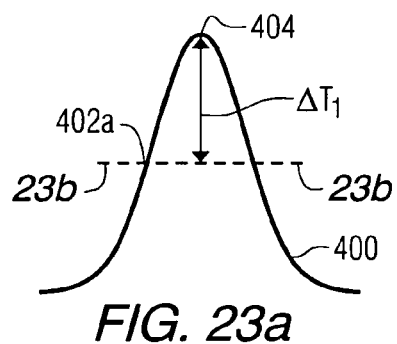
FIG. 23a is a curve representing a Guassian temperature profile.
Figure 23B:
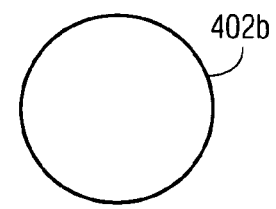

Previous transducers could create a symmetric circular Guassian temperature in a recording medium. The Gaussian cross-section 400 of such temperature profile is shown in FIG. 23a and the circular symmetry of the profile in the plane of the medium is illustrated by the equitemperature line in FIG. 23b. FIG. 23b represents the temperature along line 23b in FIG. 23b. If such a temperature profile were created in a magnetic storage medium, magnetic switching of bits in the storage medium would be performed at points 402a and 402b on the temperature profile, respectively. Thus the medium would be heated to a maximum temperature 404, $\Delta T_1$ above the temperature at the switching point. Such maximum temperatures may damage the storage medium. In addition, the curved transitions 402b on the sides of the profile hinder proper read back.

Figure 24A:
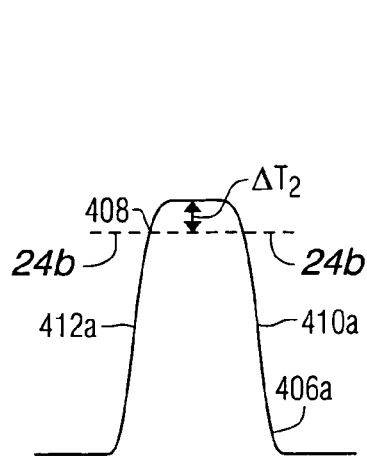
FIG. 24a is a curve representing a flat top temperature profile.
Figure 24B:
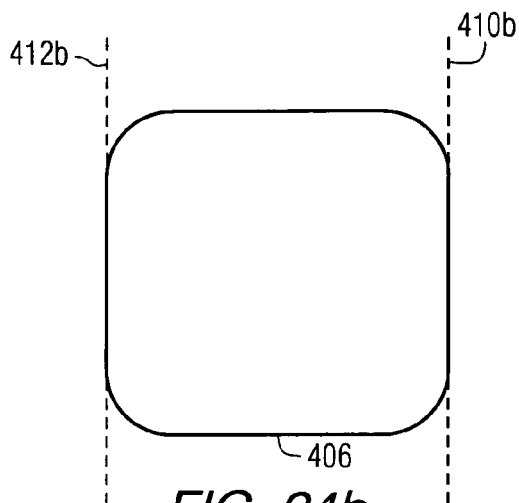

The transducers of this invention can create rectangular flat top temperature profiles in a recording medium that are either circular symmetric or rectangular. FIGS. 24a and 24b show the cross-section 406a and lateral distribution 406 of a rectangular flat top temperature profile, respectively. FIG. 24b represents the temperature along line 24b in FIG. 24b. If such a temperature profile is created in a magnetic storage medium, magnetic switching of bits in the storage medium could be performed at point 408 on the temperature profile. Thus the medium would only be heated to a maximum temperature $\Delta T_2$ above the temperature at the switching point, allowing operation at the lowest possible maximum temperature excursion $\Delta T_2$. Limiting the maximum temperature for HAMR is required to avoid lubricant desorption and media degradation. In addition, the steep slopes 410a and 412a on the sides of the profile promote narrower transition widths than those achievable with Gaussian profiles, whereas the straight transitions 410b and 412b enable proper read back from the disc.

Figure 25:
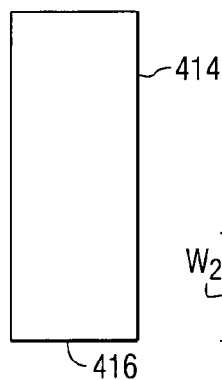
FIG. 25 is a side view of a pin that can be used in the transducers of this invention.
Figure 26:
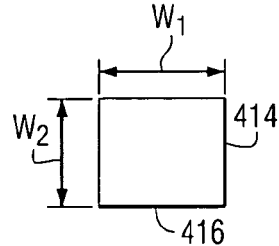
FIG. 26 is an end view of the pin of FIG. 25.

FIG. 25 is a side view of a pin 414 that can be used in the transducers of this invention. FIG. 26 is a plan view of the end 416 of the pin of FIG. 25. The end of pin 414 has a rectangular cross-section with a width $W_1$ in a first direction and a width $W_2$ in a second direction, wherein the first direction is substantially perpendicular to the second direction. At least one of the widths is less than two times the skin depth of the electromagnetic radiation that is used to excite the pin. In this example $W_1$ is equal to $W_2$. While pin 414 in FIG. 25 is shown to have a uniform square cross-section throughout its length, it should be understood that the end of the pin can alternatively have a width $W_1$ that differs from the width $W_2$, and the cross-sectional shape and dimensions can vary over the length of the pin. The length of the pin is chosen to provide resonant coupling with the electromagnetic radiation. In another example, the width in one direction can be greater than twice the skin depth of the electromagnetic radiation.

Figure 27:
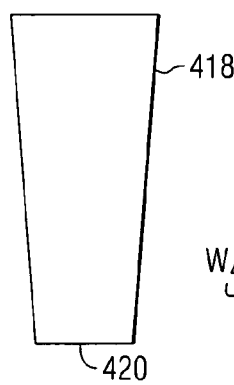
FIG. 27 is a side view of another pin that can be used in the transducers of this invention.
Figure 28:
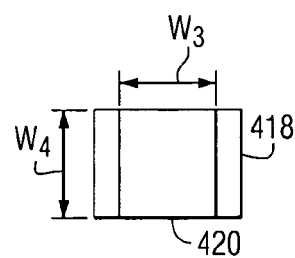
FIG. 28 is an end view of the pin of FIG. 27.

FIG. 27 is a side view of another pin 418 that can be used in the transducers of this invention. FIG. 28 is a plan view of the end 420 of the pin of FIG. 27. The end of pin 4180 has a rectangular cross-section with a width $W_3$ in a first direction and a width $W_4$ in a second direction, wherein the first direction is substantially perpendicular to the second direction. At least one of the widths is less than two times the skin depth of the electromagnetic radiation that is used to excite the pin. In this example $W_3$ is equal to $W_4$. Pin 418 in FIG. 27 is shown to have a uniform taper along two sides. Alternatively, the pin can be tapered along all four sides. Again, it should be understood that the end of the pin can alternatively have a width $W_3$ that differs from the width $W_4$, and the cross-sectional shape and dimensions can vary over the length of the pin. The length of the pin is chosen to provide resonant coupling with the electromagnetic radiation. In another example, the width in one direction can be greater than twice the skin depth of the electromagnetic radiation.

Figure 29:
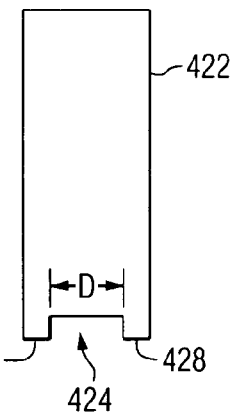
FIG. 29 is a side view of another pin that can be used in the transducers of this invention.
Figure 30:
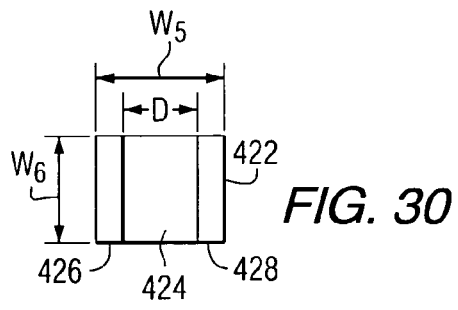
FIG. 30 is an end view of the pin of FIG. 29.

FIG. 29 is a side view of another pin 422 that can be used in the transducers of this invention. FIG. 30 is a plan view of the end 424 of the pin of FIG. 29. The body of pin 422 has a rectangular cross-section. Protrusions 426 and 428 are shown to be positioned at the end of the pin. The protrusions are separated by a distance D that is less than two times the skin depth of the electromagnetic radiation that is used to excite the pin. While pin 422 in FIG. 29 is shown to have a uniform square cross-section throughout its length, it should be understood that the end of the pin can alternatively have a width $W_5$ that differs from the width $W_6$, and the cross-sectional shape and dimensions can vary over the length of the pin. The length of the pin is chosen to provide resonant coupling with the electromagnetic radiation. In another example, the width in one direction can be greater than twice the skin depth of the electromagnetic radiation. While FIGS. 29 and 30 show protrusions on the end of the pin, an alternative example can use a groove or depression in the end of the pin to remove material from the center of the end face of the pin.

Figure 31:
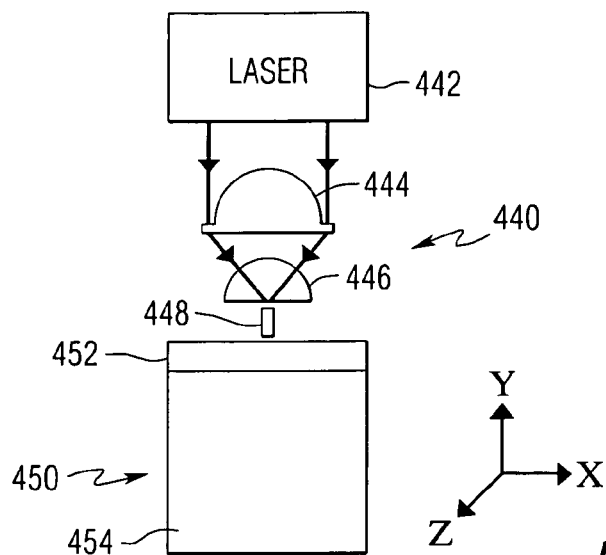
FIG. 31 is a schematic representation of an optical transducer and an associated storage medium.

FIG. 31 is a schematic representation of a system 440 used to simulate local heating in a storage medium. The system 440 includes a source of laser light 442, a focusing lens 444, a solid hemispherical lens 446, and an elongated metallic nano-wire, forming the pin 448. A radially polarized beam of light, having unit power over the lens aperture, is brought to focus onto the center of hemisphere by an objective lens, and illuminates the gold pin. A magnetic storage medium 450, is positioned 10 nm below the transducer, and includes a 12 nm thick cobalt storage layer 452, and a 100 nm thick gold heat-sink layer 454. The numerical aperture of the objective lens is 0.85, and the refractive index of the solid hemispherical lens is 2.09.

FIG. 31 shows a STM-like optical transducer and a magnetic storage media. X, Y, Z are three axes of a right-handed Cartesian coordinate system. The origin of the coordinate system (x, y, z)=(0, 0, 0) is at the center of the solid hemisphere.

As long as the cross-section of the tip of the pin is smaller than twice the optical skin depth, the field distribution just below the tip will be homogenous throughout the area of the tip and reflect the tip shape. Such field distribution, illustrated in FIG. 24 for a square shaped tip, is best approximated by the product of two one-dimensional super-Gaussians of high order, but transforms very fast into an ordinary Gaussian with increasing distance from the tip. Tip/media distances larger than 5 nm will lead to significant curvature in the center region of the profile.

The electric field distribution below a single rectangular tip that is wider than twice the optical skin depth will show maxima at the tip edges since the plasmon modes leading to the electric field enhancement are confined in the optical skin depth.

Although the electric field distribution is broader for wide tips than the distribution of the square shaped pin in FIGS. 25 and 26, it is more flat in the center region for tip/media spacing larger than 5 nm. Hence, a wide tip will be advantageous for HAMR when high bit aspect ratios (allowing for relatively wide tracks) are used and when the system is operated at tip/media spacing larger than 5 nm.

Figure 32:
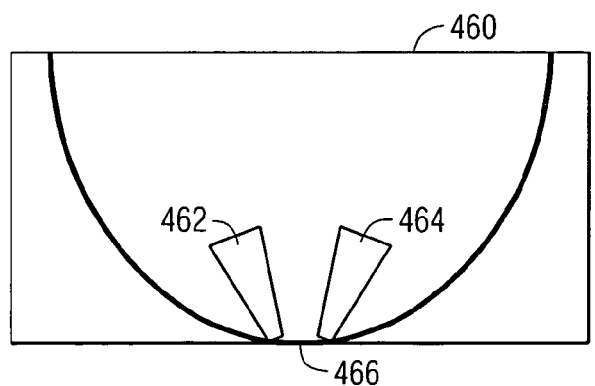
FIGS. 32 and 33 are schematic representations of additional transducers constructed in accordance with this invention.
Figure 33:
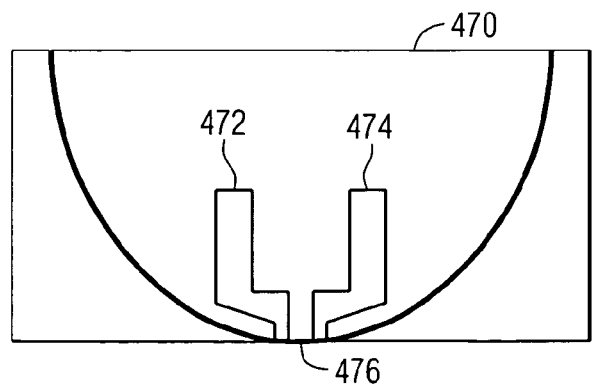

Another way to obtain flat top temperature profiles at relatively large tip/media spacing that might lead to enhanced light to heat conversion efficiencies is to use two metallic pins that are displaced along the cross track direction as schematically shown in FIGS. 32 and 33. The transducer of FIG. 32 includes a planar waveguide 460 and two metal pins 462 and 464 embedded in the waveguide. The waveguide is configured to focus electromagnetic radiation to a focal point 466 near the two pins. The pins are positioned to provide a relatively large spacing between the pins at their tops to avoid screening, i.e. ensure good efficiency for each single tip.

There are many design possibilities for pins separated at the top and close together at the bottom. FIG. 33 shows a transducer that includes a planar waveguide 470 and two metal pins 472 and 474 embedded in the waveguide. The waveguide is configured to focus electromagnetic radiation to a focal point 476 near the two pins. The pins are shaped to provide a relatively large spacing between the pins at their tops to avoid screening, i.e. ensure good efficiency for each single tip. Other examples can include more than two pins for field profile shaping and light to heat conversion enhancement.

In general the field distribution below the two tips will be similar to the one for a single elongated tip shown in FIGS. 25 and 26, but the modulation depth between the two maxima and their distance can easily be controlled by variation of the spacing of the two tips.

Figure 34:
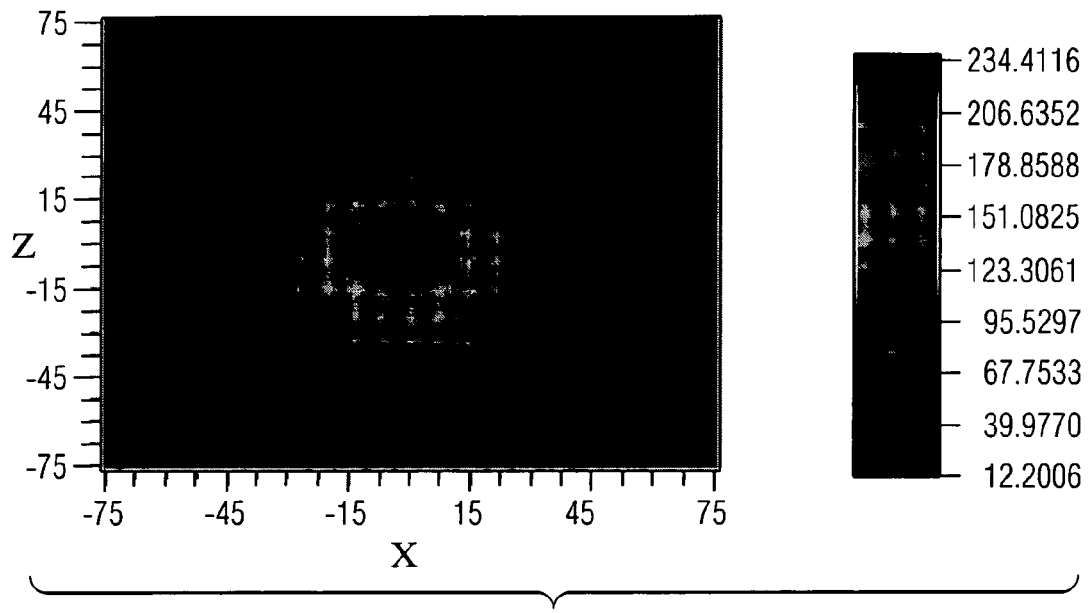
FIGS. 34 and 35 illustrate calculated temperature profiles in a storage medium.
Figure 35:
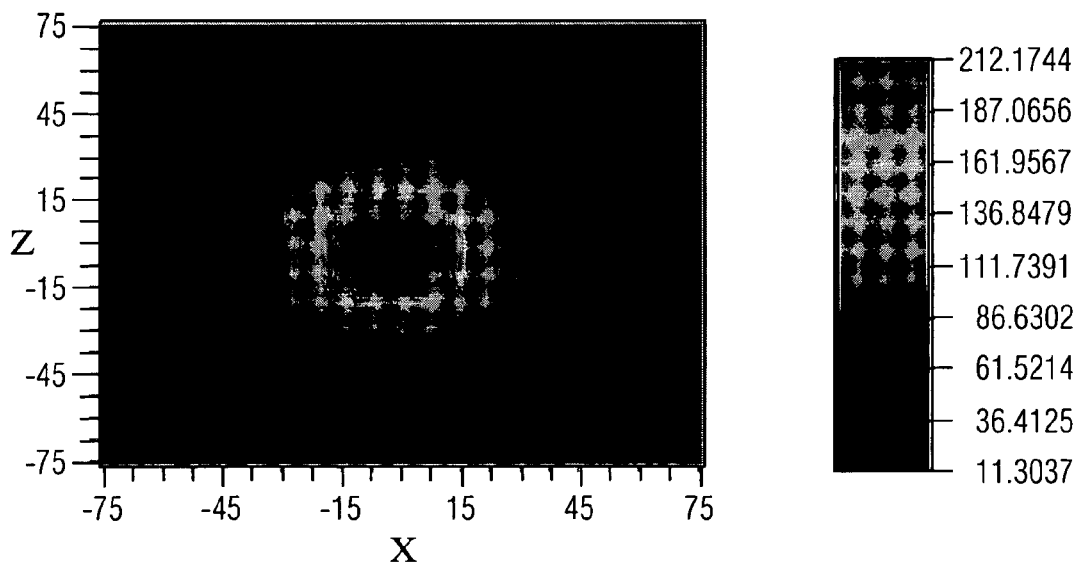

FIGS. 34 and 35 show calculated thermal distributions for different pin configurations for the system illustrated in FIG. 31. The electric field distribution corresponds to a thermal profile that would be created in the media. In the thermal simulations, it was assumed that the optical properties (the index of refraction) and thermal coefficients (the specific heat C and thermal conductivity K) of all materials involved, including the solid hemisphere, a gold pin, a 24 nm storage layer, a 100 nm gold heat-sink layer, and a substrate, are temperature-independent. Heat flow from the gold pin to the storage media is not taken into account in the thermal calculation. It was assumed that the specific heat $C=2$ joule/cm$^3$/° C. for all the materials, and that the thermal conductivity $K=0.1$ watt/cm/° C. for the storage layer, $K=3$ watt/cm/° C. for the gold heat-sink layer, and $K=0.1$ watt/cm/° C. for the substrate.

In one example, a gold pin was assumed to have dimensions of 48 nm wide along the x-axis, 48 nm wide along the z-axis, and 96 nm along the y-axis. Both ends were assumed to be flat. The gap between the pin and the film was assumed to be 5 nm. In the simulation it was assumed that the light has a wavelength of 830 nm, the complex refractive index is 0.188+j5.89 for the gold pin and film, and the complex refractive index is 2.53+j4.88 for the cobalt film.

In another example, simulated silver pins were assumed to be 25 nm wide along x-axis and 25 nm wide along the z-axis. The pin length was assumed to be 96 nm. The air gap between the pin and the storage medium was 2.5 nm. Two cases were simulated: (1) both ends of the pin are flat, as shown in FIGS. 25 and 26; and (2) the pin end nearest to the storage medium is shaped, as shown in FIGS. 29 and 30. The light wavelength $\lambda=830$ nm, and the complex refractive index n=0.145+j5.5 for the silver pin.

Figure 36:
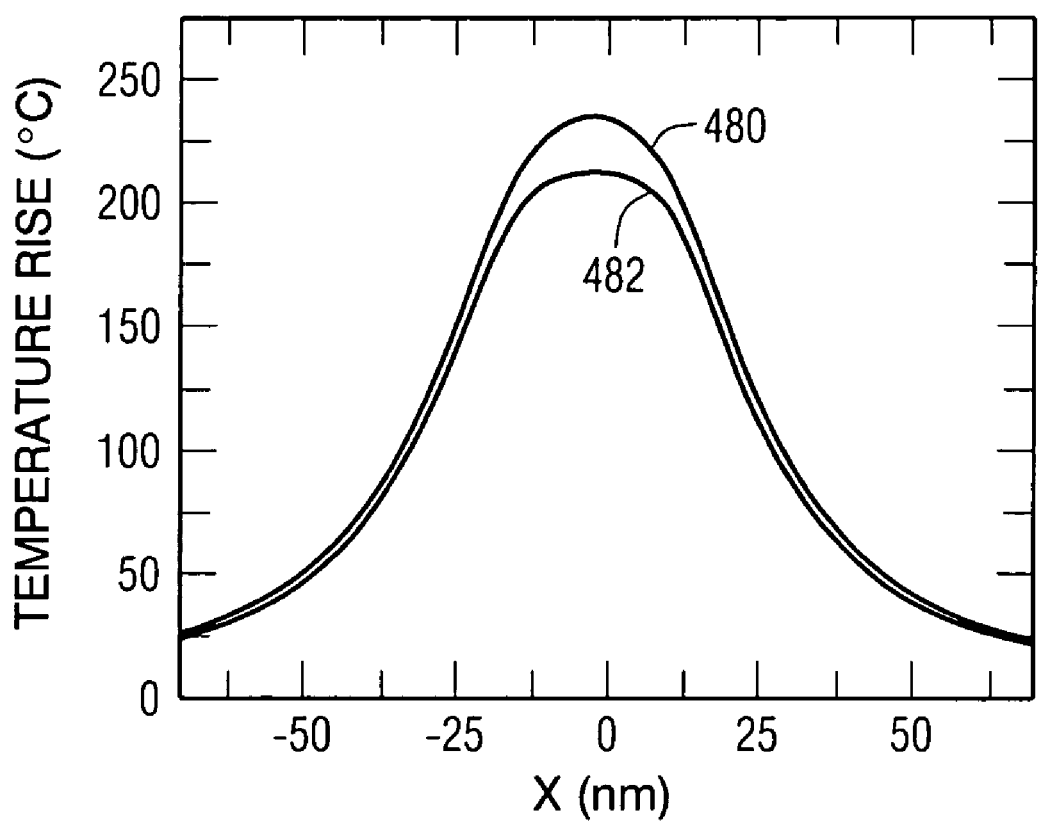
FIG. 36 is a graph of calculated temperature profiles in a storage medium.

FIGS. 34 and 35 show the profile of the calculated temperature rise at the surface of the storage layer under illumination of the laser at the output of 10 mW for 2 ns duration. In FIGS. 34 and 35, length has the units of nanometers, and temperature rise has the units of centigrade degrees. FIG. 36 shows temperature rise versus x at z=0. Curve 480 represents the temperature rise for a pin that is flat at each end as shown in FIGS. 25 and 26. Curve 482 represents the temperature rise for a pin that is shaped at one end as shown in FIGS. 29 and 30. Comparing curve 480 with curve 482, it is evident that the pin of curve 482 yields a temperature profile that is closer to that of a flat top temperature profile.

This invention also encompasses a method of heating a portion of a storage medium. The method comprises: placing a conductive pin adjacent to a surface of the storage medium; directing electromagnetic radiation onto the pin; and using the electromagnetic radiation to create a rectangular flat top electric field distribution at the surface of a storage medium. The end of the pin can have a width of less than two times a skin depth of the electromagnetic radiation in the pin.

By appropriately controlling the pin to medium spacing, the pins of FIGS. 25-30 can be used to produce an electromagnetic field profile in a storage medium positioned adjacent to the end of the pins that has a rectangular flat top shape.

Figure 37A:
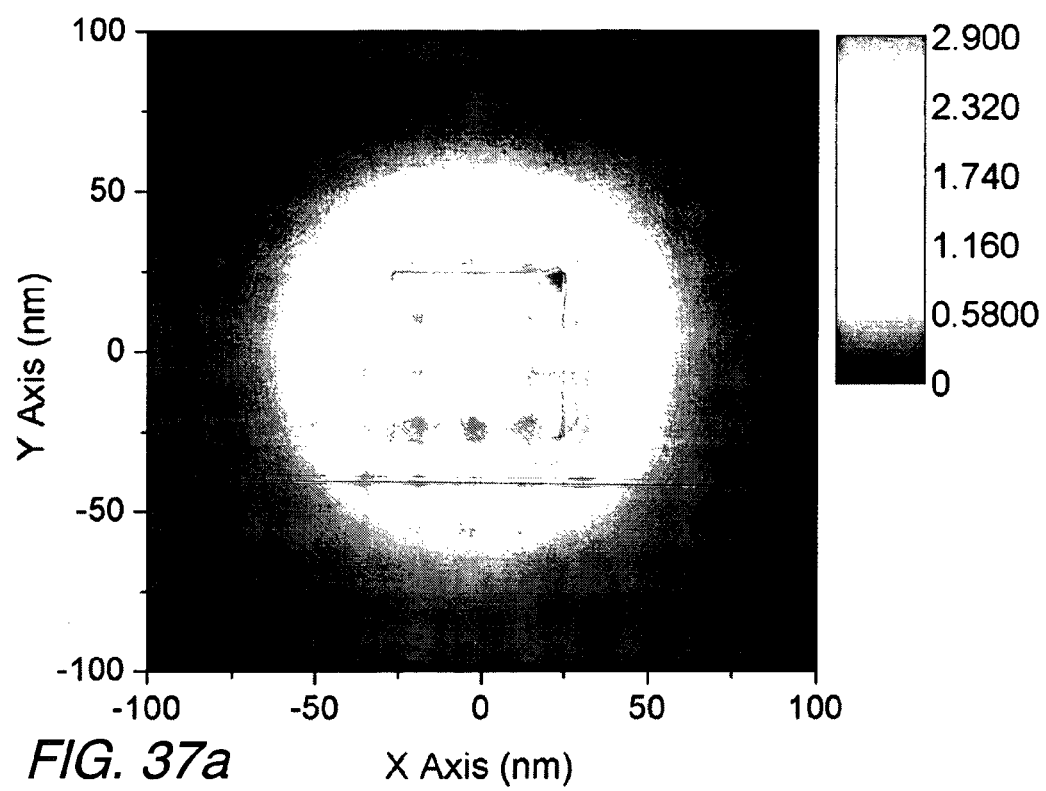
FIGS. 37a-e, 38a-e and 39a-e illustrate calculated electric field profiles in a storage medium.
Figure 37B:
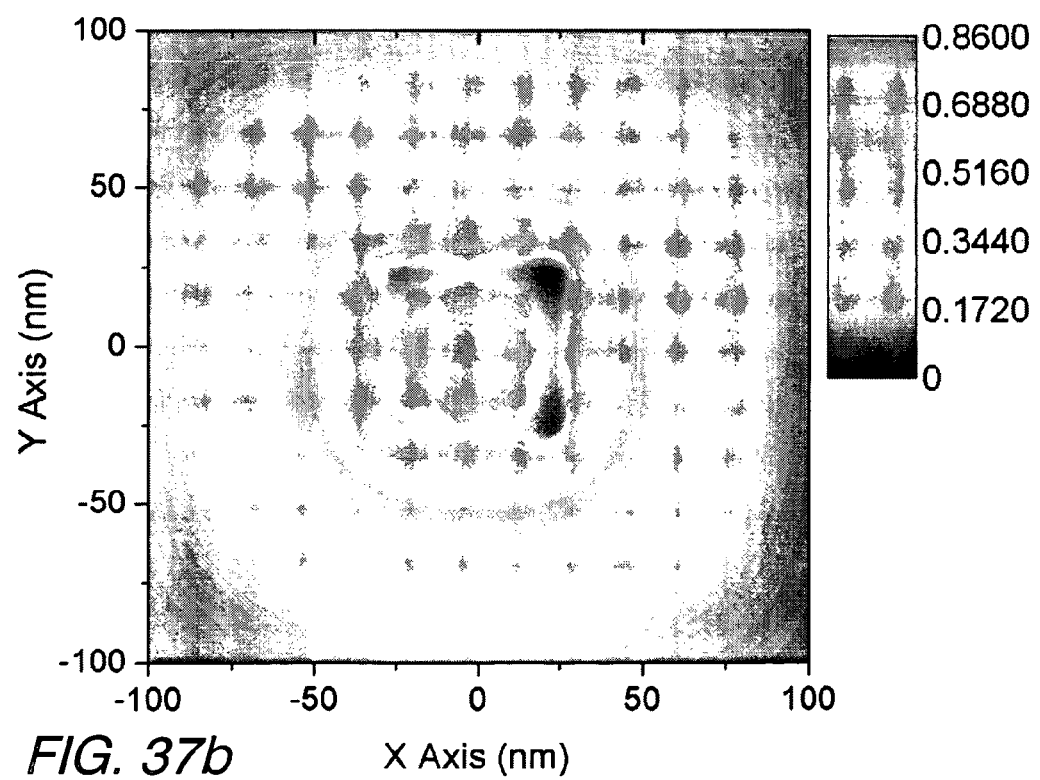
Figure 37C:
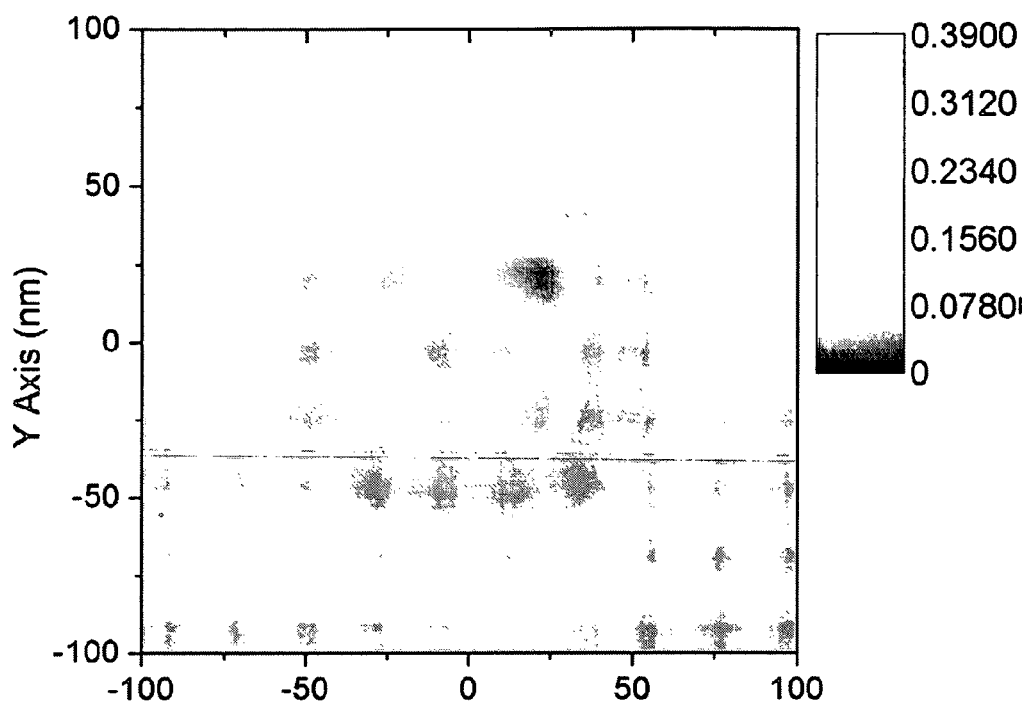
Figure 37D:
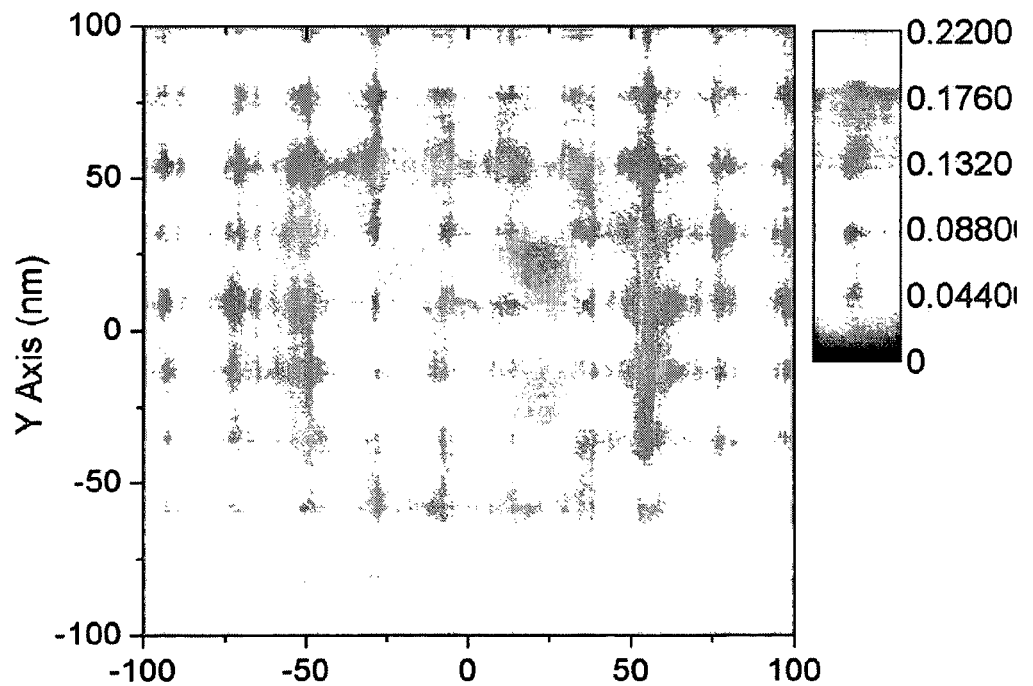
Figure 37E:
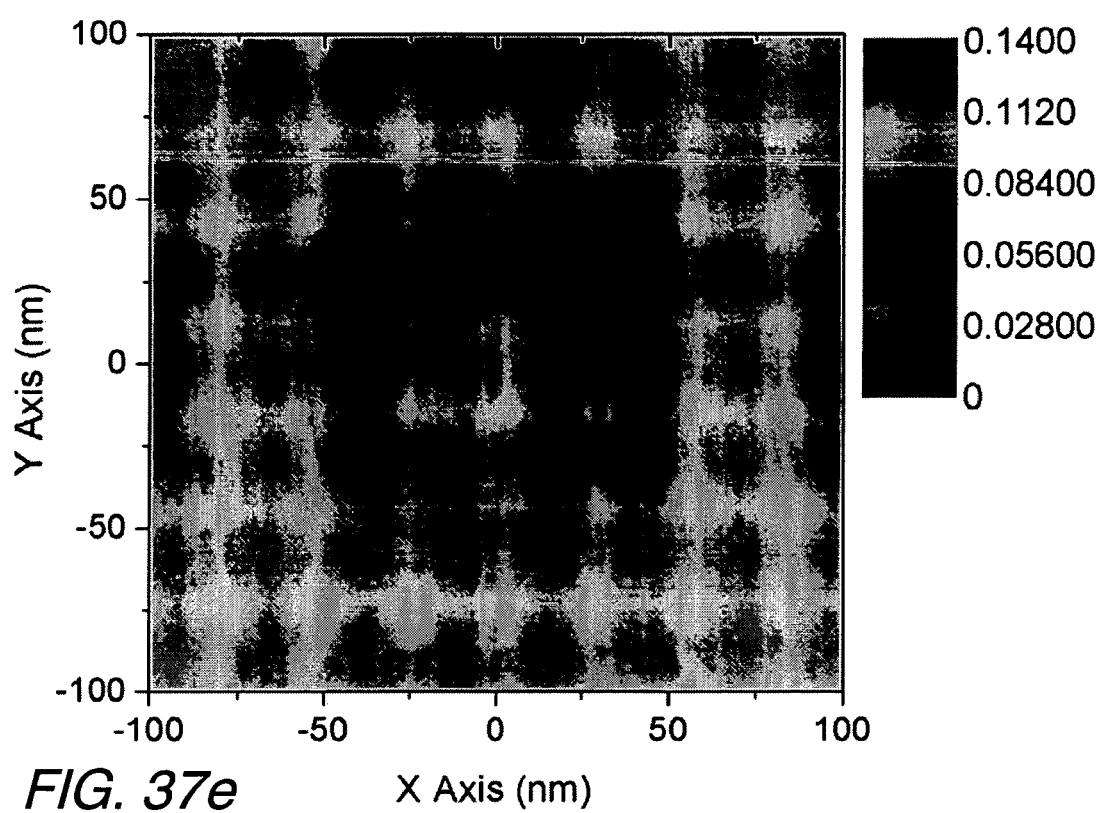

For pin-media spacing of <5 nm, a single square shaped pin can be located at the focus of the parabolic waveguide and used to heat the media. The small pin-media spacing ensures that the excitation profile in the media reflect the shape of the pin tip. It will be best approximated by a super-Gaussian thermal distribution of high order. Lateral thermal diffusion might cause some curvature of the resulting temperature profile and should be suppressed as much as possible. FIGS. 37a through 37e are schematic representations of a calculated $|E|^2$ electric field distribution at the surface of a storage medium using the pin 414 of FIGS. 25 and 26. The data in FIGS. 37a-37e assumes the use of a pin having a 50 nm square cross-section and a length of 225 nm. FIG. 37a shows the calculated electric field distribution for a pin to medium spacing of 5 nm. FIG. 37b shows the calculated electric field distribution for a pin to medium spacing of 10 nm. FIG. 37c shows the calculated electric field distribution for a pin to medium spacing of 15 nm. FIG. 37d shows the calculated electric field distribution for a pin to medium spacing of 20 nm. FIG. 37e shows the calculated electric field distribution for a pin to medium spacing of 25 nm. The electric field distribution corresponds to a thermal distribution that would be created at the surface of the storage medium. FIGS. 37a-37e show that the thermal distribution would be substantially flat under the pin, with sharp and straight gradients at the edges of the pin. The gradients become less sharp and more curved as the pin to medium spacing increases.

Figure 38A:
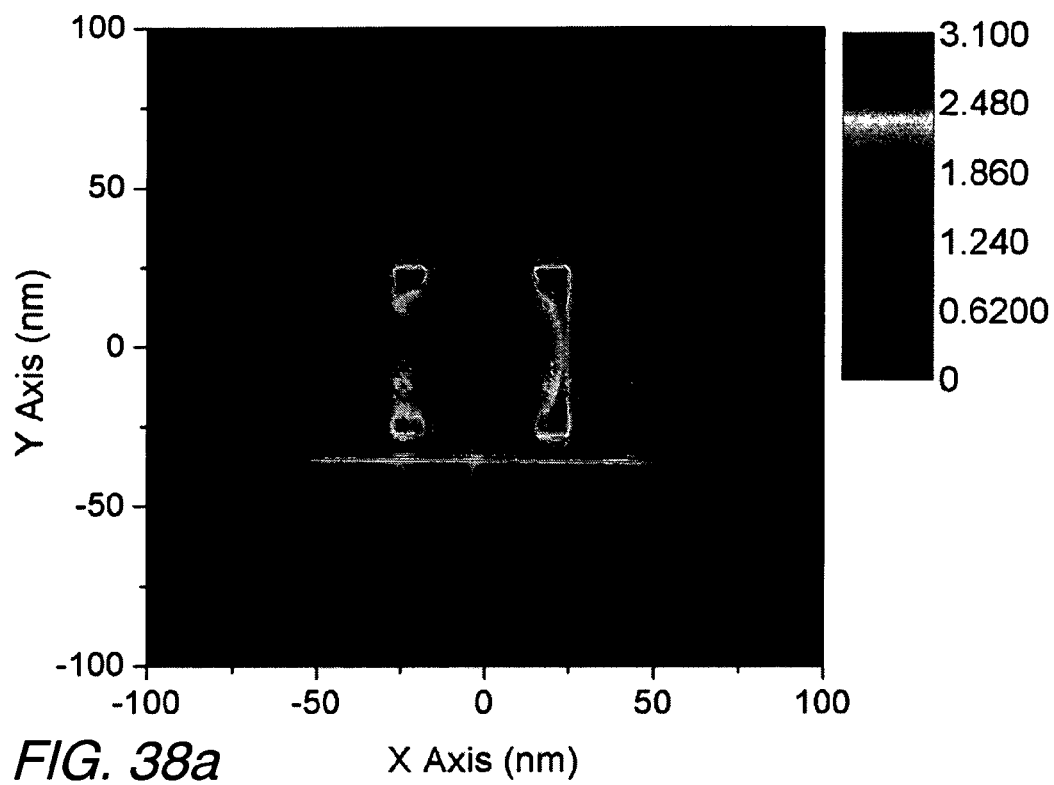
Figure 38B:
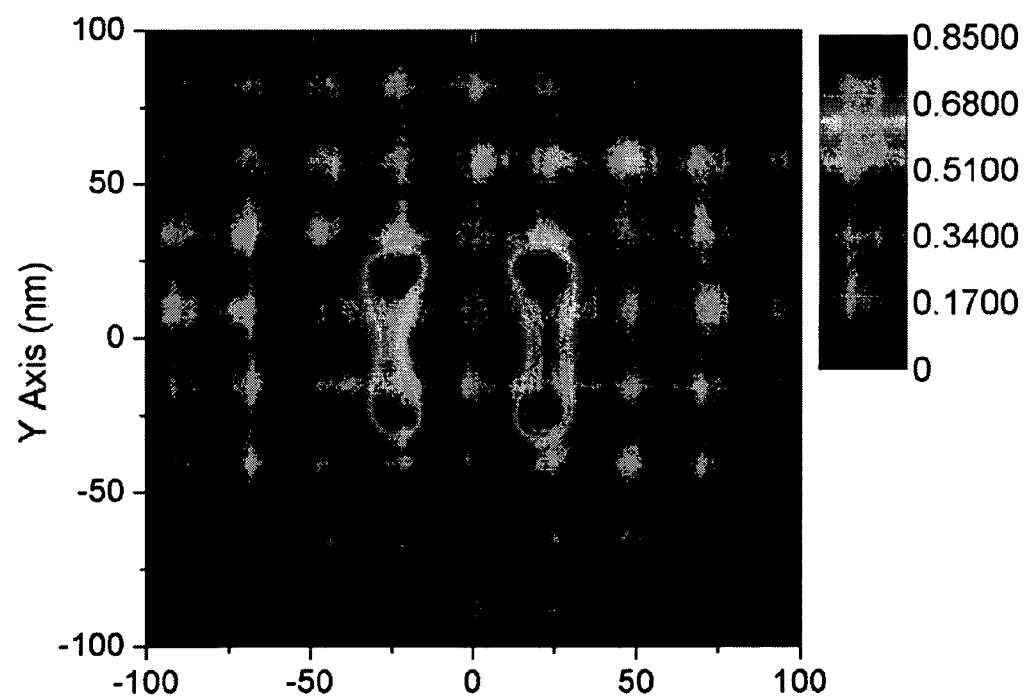
Figure 38C:
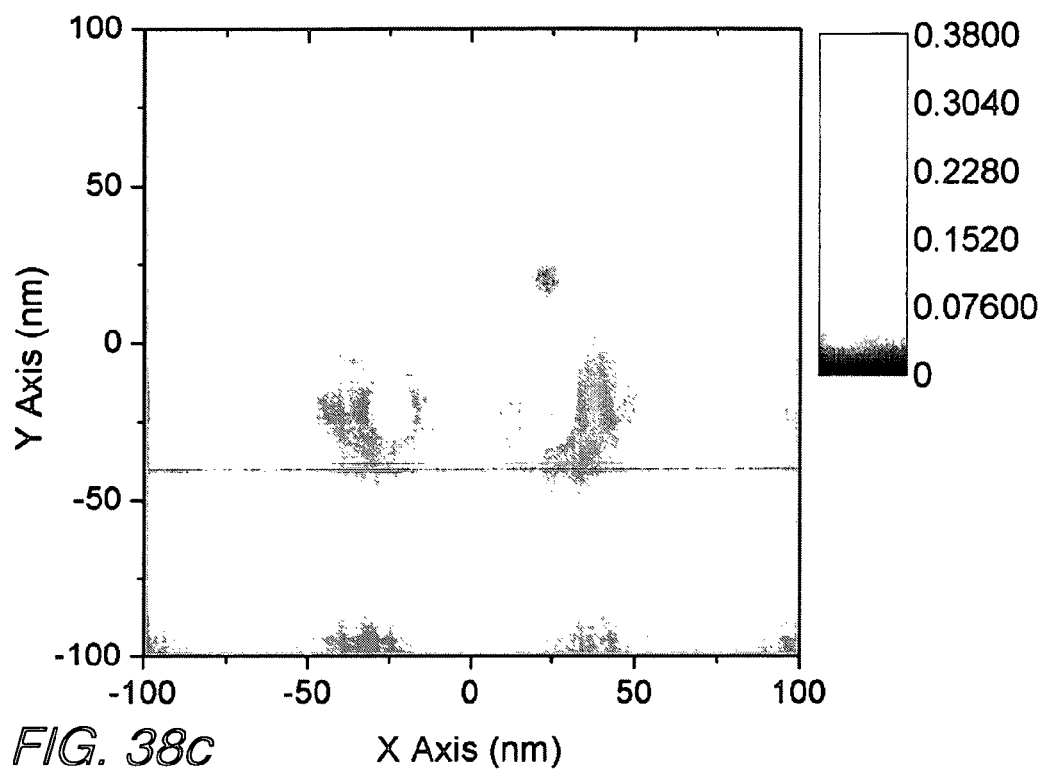
Figure 38D:
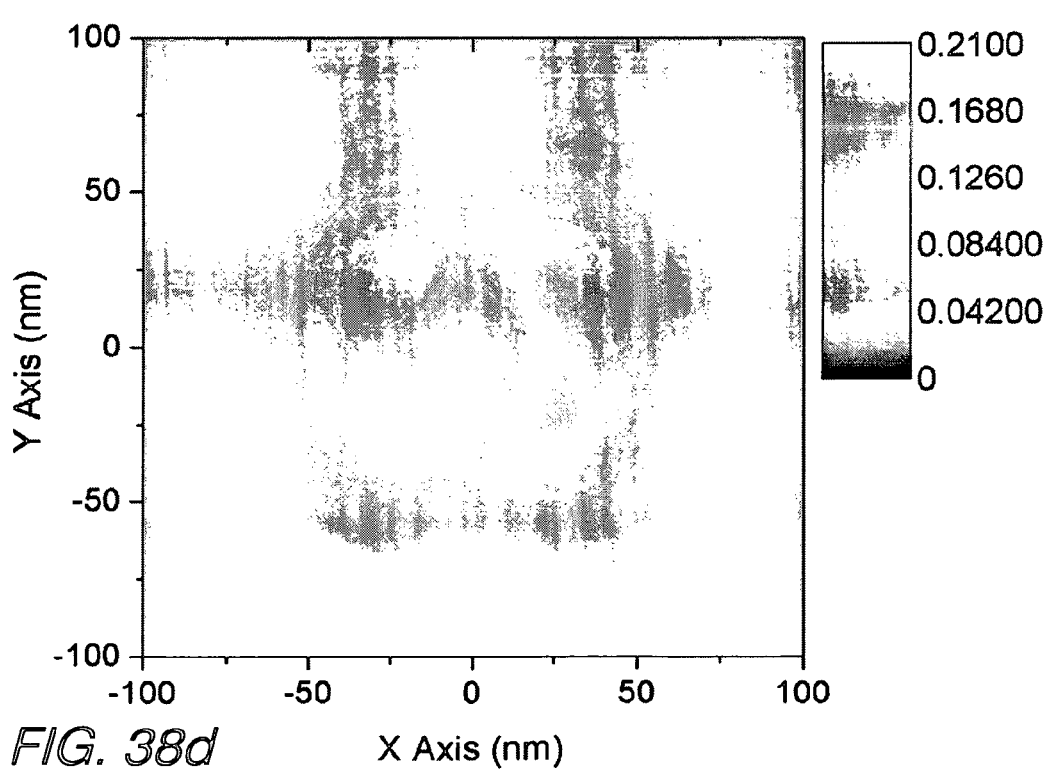
Figure 38E:
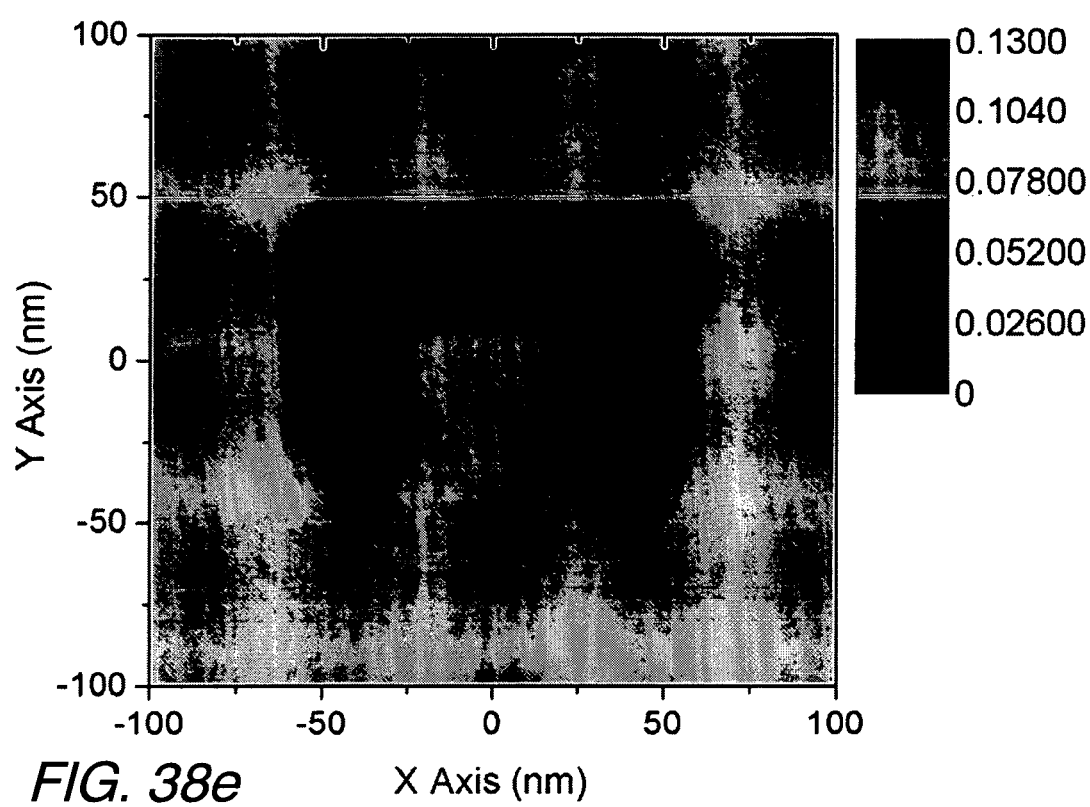

FIGS. 38a through 38e are schematic representations of a calculated $|E|^2$ electric field distribution at the surface of a storage medium using the pin 422 of FIGS. 29 and 30. The data in FIGS. 38a-38e assumes the use of a pin having a 50 nm square cross-section and a length of 225 nm. Protrusions illustrated as items 426 and 428 in FIG. 29 were assumed to each have a width of 10 nm and a height of 10 nm. Therefore the distance between the protrusions was assumed to be 30 nm. FIG. 38a shows the calculated electric field distribution for a pin to medium spacing of 5 nm. FIG. 38b shows the calculated electric field distribution for a pin to medium spacing of 10 nm. FIG. 38c shows the calculated electric field distribution for a pin to medium spacing of 15 nm. FIG. 38d shows the calculated electric field distribution for a pin to medium spacing of 20 nm. FIG. 38e shows the calculated electric field distribution for a pin to medium spacing of 25 nm. The electric field distribution corresponds to a thermal distribution that would be created at the surface of the storage medium. FIGS. 38a-38e show that the thermal distribution would be substantially flat under the pin, with sharp, straight gradients at the edges of the pin. The sharpness and straightness of the gradients decreases as the pin to media spacing increases.

Figure 39A:
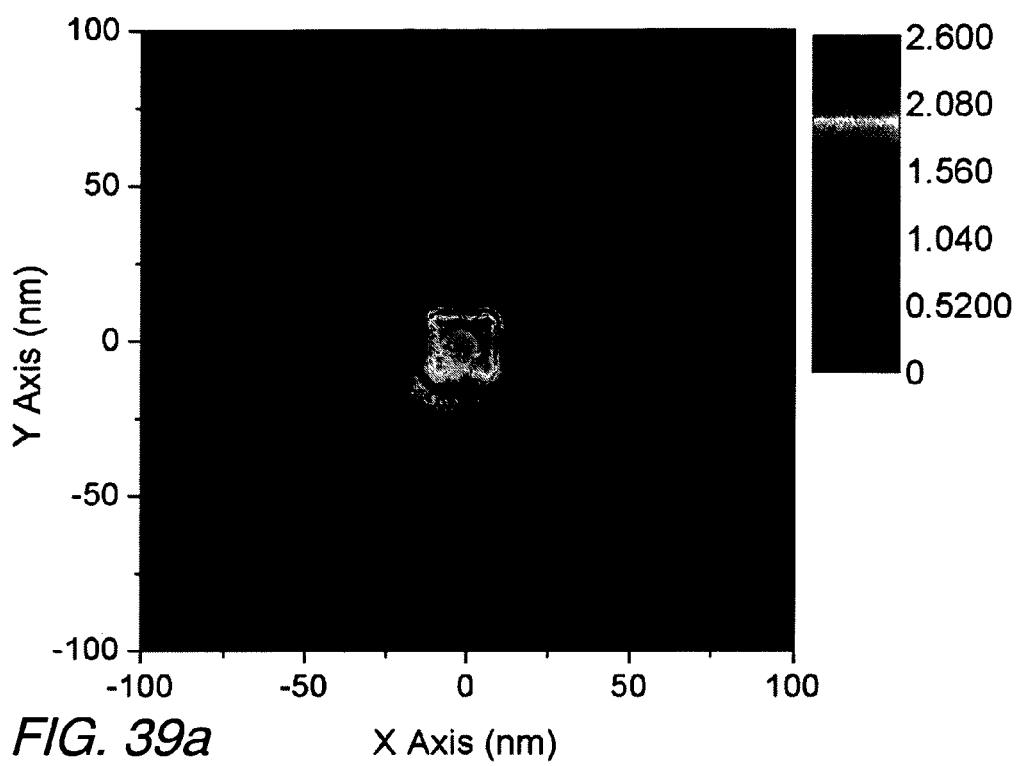
Figure 39B:
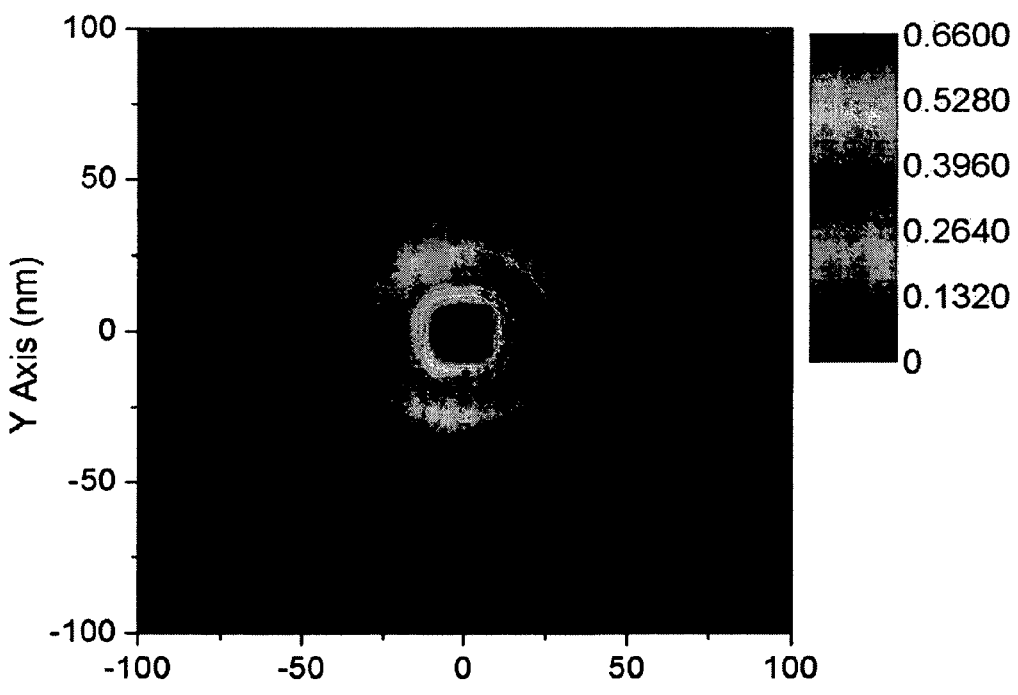
Figure 39C:
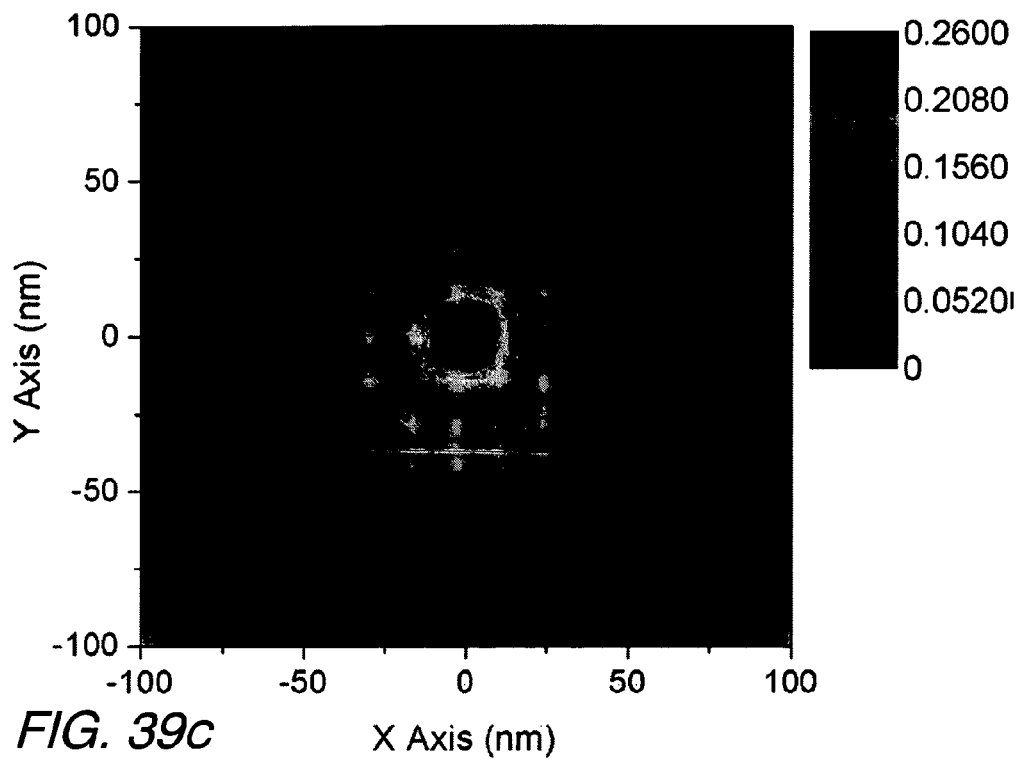
Figure 39D:
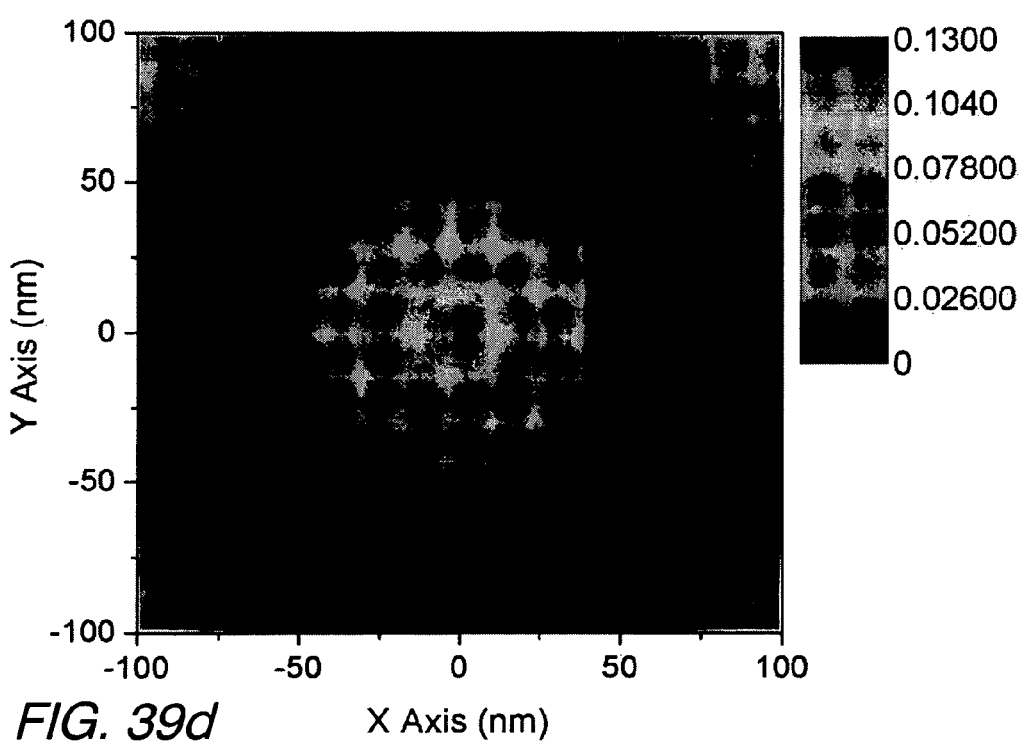
Figure 39E:
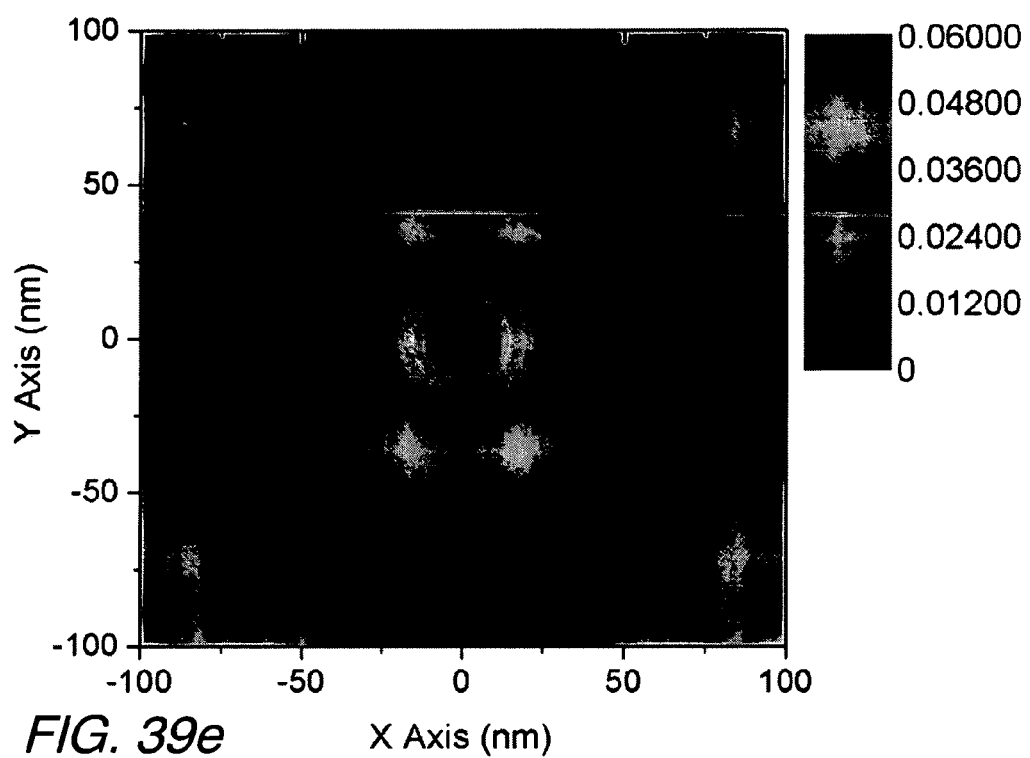

FIGS. 39a through 39e are schematic representations of a calculated $|E|^2$ electric field distribution at the surface of a storage medium using the pin 418 of FIGS. 27 and 28. The data in FIGS. 39a-39e assumes the use of a tapered pin having a 50 nm square cross-section at the end farthest from the media, a 20 nm square cross-section at the end closest to the media, and a length of 225 nm. FIG. 39a shows the calculated electric field distribution for a pin to medium spacing of 5 nm. FIG. 39b shows the calculated electric field distribution for a pin to medium spacing of 10 nm. FIG. 39c shows the calculated electric field distribution for a pin to medium spacing of 15 nm. FIG. 39d shows the calculated electric field distribution for a pin to medium spacing of 20 nm. FIG. 39e shows the calculated electric field distribution for a pin to medium spacing of 25 nm. The electric field distribution corresponds to a thermal distribution that would be created at the surface of the storage medium. FIGS. 39a-39e show that the thermal distribution would be substantially flat under the pin, with sharp, straight gradients at the edges of the pin. The sharpness and straightness of the gradients decreases as the pin to media spacing increases.

For pin-media spacing >5 nm, either a single rectangular pin wider (along the cross track direction) than twice the optical skin depth, or two separate pins offset along the cross track direction can be located in the vicinity of the focus of the parabolic waveguide and used to heat the media. The near field distribution just below the pins shows two maxima (at the edges of the single pin/below the tips of the two separated pins) and the blurring of this distribution with increasing distance or due to lateral thermal diffusion will lead again to a flat temperature profile along the cross track direction.

While the present invention has been described in terms of several examples, it will be apparent to those skilled in the art that various changes can be made to the disclosed examples without departing from the scope of the invention as defined by the following claims.

What is claimed is:

1. A transducer comprising:
   a conductive pin;
   a waveguide for directing electromagnetic radiation onto the pin; and
   first and second spaced protrusions on an end of the pin to create a rectangular flat top field distribution at a surface of a storage medium positioned adjacent to the end of the pin, leading to a flat top thermal profile within the storage medium.

2. The transducer of claim 1, wherein the end of the pin has a width of less than two times a skin depth of the electromagnetic radiation in the pin.

3. The transducer of claim 1, wherein the pin has a rectangular cross-section in a plane parallel to a surface of the storage medium.

4. The transducer of claim 1, wherein the pin includes a tapered portion adjacent to the end of the pin.

5. A transducer comprising:
   a conductive pin;
   a waveguide for directing electromagnetic radiation onto the pin; and
   a groove or depression in an end of the pin to create a rectangular flat top field distribution at a surface of a storage medium positioned adjacent to the end of the pin, leading to a flat top thermal profile within the storage medium.

6. The transducer of claim 1, wherein the electromagnetic radiation is polarized and directed to a focal point; and
   the end of the pin is positioned adjacent to the focal point.

7. A transducer comprising:
   first and second conductive pins;
   a waveguide for directing electromagnetic radiation onto the first and second conductive pins; and
   wherein the pins are configured to create a rectangular flat top field distribution at a surface of a storage medium positioned adjacent to ends of the pins, leading to a flat top thermal profile within the storage medium.

8. The transducer of claim 7, wherein the ends of the pins have a width of less than two times a skin depth of the electromagnetic radiation in the pins.

9. The transducer of claim 7, wherein the pins have a rectangular cross-section in a plane parallel to a surface of the storage medium.

10. The transducer of claim 7, wherein each of the pins includes a tapered portion adjacent to the end of the pin.

11. The transducer of claim 7, wherein each of the pins further comprises:
    first and second spaced protrusions on the end of the pin.

12. The transducer of claim 7, wherein each of the pins further comprises:
a depression in the end of the pin.

13. The transducer of claim 7, wherein the electromagnetic radiation is polarized and directed to a focal point; and
the pins are positioned adjacent to the focal point.

14. A recording head comprising:
a magnetic write pole;
a waveguide positioned adjacent to the magnetic write pole for directing electromagnetic radiation onto a conductive pin; and
either first and second spaced protrusions on an end of the pin, or a groove or depression in the end of the pin configured to create a rectangular flat top field distribution at a surface of a storage medium positioned adjacent to the end of the pin, leading to a flat top thermal profile within the storage medium.

15. A disc drive comprising:
a motor for rotating a storage medium; and
an arm for positioning a recording head adjacent to a surface of the storage medium;
wherein the recording head comprises a magnetic write pole, a waveguide positioned adjacent to the magnetic write pole for directing electromagnetic radiation onto a conductive pin; and
either first and second spaced protrusions on an end of the pin, or a groove or depression in the end of the in configured to create a rectangular flat top field distribution at a surface of a storage medium positioned adjacent to the end of the pin, leading to a flat top thermal profile within the storage medium.

16. The disc drive of claim 15, wherein a distance between the pin and the storage medium is less than a width of a bottom surface of the pin.

17. A method of heating a portion of a storage medium, the method comprising:
placing a conductive pin adjacent to a surface of the storage medium, wherein the pin includes either first and second spaced protrusions on an end of the pin, or a groove or depression in the end of the pin;
directing electromagnetic radiation onto the pin; and
using the electromagnetic radiation to create a rectangular flat top field distribution at a surface of a storage medium positioned adjacent to the end of the pin, leading to a flat top thermal profile within the storage medium.

18. The method of claim 17, wherein a distance between the pin and the storage medium is less than a width of a bottom surface of the pin.

19. The method of claim 17, wherein the end of the pin has a width of less than two times a skin depth of the electromagnetic radiation in the pin.

20. The transducer of claim 5, wherein the end of the pin has a width of less than two times a skin depth of the electromagnetic radiation in the pin.

21. The transducer of claim 5, wherein the pin has a rectangular cross-section in a plane parallel to a surface of the storage medium.

22. The transducer of claim 5, wherein the pin includes a tapered portion adjacent to the end of the pin.

23. The transducer of claim 5, wherein the electromagnetic radiation is polarized and directed to a focal point; and
the end of the pin is positioned adjacent to the focal point.

* * * * *

UNITED STATES PATENT AND TRADEMARK OFFICE
CERTIFICATE OF CORRECTION

PATENT NO. : 7,412,143 B2
APPLICATION NO. : 10/945077
DATED : August 12, 2008
INVENTOR(S) : Robert Earl Rottmayer et al.

Page 1 of 1

It is certified that error appears in the above-identified patent and that said Letters Patent is hereby corrected as shown below:

Detailed Description of the Invention; should read;

Column 12, Line 52
In the embodiment of FIG. 19 it is [[450]] 45°.

Column 13, Line 59
FIG. 23*b* represents the temperature along line 23*b* in FIG. [[23*b*.]] 23*a.*

Column 14, Line 6
FIG. 24*b* represents the temperature along the line 24*b* in FIG. [[24*b*.]] 24*a.*

Claims

Column 19, Line 28
"...pin, or a groove or depression in the end of the [[in]] pin configured to create..."

Signed and Sealed this

Seventh Day of July, 2009

JOHN DOLL
*Acting Director of the United States Patent and Trademark Office*